US012742432B2

(12) United States Patent
Kulkarni et al.

(10) Patent No.: US 12,742,432 B2
(45) Date of Patent: Sep. 22, 2026

(54) CYLINDER BLOCK AND INTERNAL COMBUSTION ENGINE SYSTEM

(71) Applicant: CUMMINS INC., Columbus, IN (US)

(72) Inventors: Snehal Kulkarni, Columbus, IN (US); Vijaysai Karuppiah Kumareshan, Columbus, IN (US); Patricia Madigan, Columbus, IN (US); Nathaniel P. Hassall, Columbus, IN (US); David M. Barnes, Columbus, IN (US); Eric R. Downey, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/936,345

(22) Filed: Nov. 4, 2024

(65) Prior Publication Data

US 2025/0059930 A1 Feb. 20, 2025

Related U.S. Application Data

(63) Continuation of application No. PCT/US2023/021127, filed on May 5, 2023.

(60) Provisional application No. 63/339,026, filed on May 6, 2022.

(51) Int. Cl.

| | |
|---|---|
| ***F02F 7/00*** | (2006.01) |
| ***F02F 11/00*** | (2006.01) |
| *F02B 75/20* | (2006.01) |
| *F02F 1/42* | (2006.01) |

(52) U.S. Cl.

CPC .......... *F02F 7/0021* (2013.01); *F02F 11/002* (2013.01); *F02B 75/20* (2013.01); *F02F 1/42* (2013.01)

(58) Field of Classification Search

CPC .......... F02F 7/0021; F02F 11/002; F02F 1/42; F02F 1/102; F02F 7/0007; F02B 75/20

See application file for complete search history.

(56) References Cited

U.S. PATENT DOCUMENTS 5,247,915 A 9/1993 Sasada et al.
6,295,954 B1 10/2001 Suzuki
6,886,522 B1 * 5/2005 Lawrence ................ F02F 1/40 123/195 R (Continued)

FOREIGN PATENT DOCUMENTS

EP 1 195 504 A2 4/2002
EP 1522708 A2 * 4/2005 ............ F02F 7/0007

(Continued)

OTHER PUBLICATIONS

International Search Report and Written Opinion for PCT Application No. PCT/US2023/021127 dated Aug. 9, 2023.

(Continued)

*Primary Examiner* — Syed O Hasan
(74) *Attorney, Agent, or Firm* — Foley & Lardner LLP

(57) ABSTRACT

A cylinder block includes a cylinder block body and a load path structure. The cylinder block body defines a first cylinder block upper bore. The load path structure includes a first support rib having a first support rib body interfacing with the first cylinder block upper bore. The load path structure is configured to transfer a load from the first cylinder block upper bore along a non-linear path within the cylinder block body away from the first cylinder block upper bore.

20 Claims, 12 Drawing Sheets

(56) References Cited

U.S. PATENT DOCUMENTS

| | | | | |
|---|---|---|---|---|
| 7,077,079 | B2 | 7/2006 | Matsuo | |
| 7,077,095 | B2 | 7/2006 | Hada et al. | |
| 8,375,927 | B2 * | 2/2013 | Berger | F02F 7/0007 123/196 R |
| 10,132,269 | B2 | 11/2018 | Magro | |
| 2005/0132996 | A1 * | 6/2005 | Sachdev | F02F 7/0031 123/193.3 |
| 2014/0261285 | A1 | 9/2014 | Williams et al. | |
| 2015/0315994 | A1 * | 11/2015 | Quinton | F02F 1/10 164/47 |
| 2015/0315996 | A1 * | 11/2015 | Quinton | F02F 7/0068 29/888.06 |
| 2018/0230935 | A1 * | 8/2018 | Ali | F01P 3/02 |

FOREIGN PATENT DOCUMENTS

| | | | | |
|---|---|---|---|---|
| EP | 3 088 719 | A1 | | 11/2016 |
| JP | H06-066199 | A | | 3/1994 |
| JP | H0666199 | A | * | 3/1994 |
| JP | 2002-242755 | A | | 8/2002 |

OTHER PUBLICATIONS

What is a Draft Angle or Draft for Plastic Injection Molding Design, 3D Prototype Designer, Apr. 4, 2021, https://3d-printing-expert.com/what-is-a-draft-angle-or-draft-for-plastic-injection-molding-design/ [Accessed Jan. 5. 2021].

* cited by examiner

CYLINDER BLOCK AND INTERNAL COMBUSTION ENGINE SYSTEM

CROSS-REFERENCE TO RELATED PATENT APPLICATIONS

The present application is the continuation of PCT Application No. PCT/US2023/021127, filed May 5, 2023, which claims priority to and the benefit of U.S. Provisional Patent Application No. 63/339,026, filed May 6, 2022, the contents of which are incorporated herein by reference.

TECHNICAL FIELD

The present application relates generally to cylinder blocks for internal combustion engine systems.

BACKGROUND

An internal combustion engine may include a cylinder head and a cylinder block. The cylinder head may be coupled to the cylinder block using a plurality of fasteners. When fuel is combusted by the internal combustion engine, forces may be transferred between the cylinder head and the cylinder block along the fasteners.

SUMMARY

In one set of embodiments, a cylinder block includes a cylinder block body and a load path structure. The cylinder block body defines a first cylinder block upper bore. The load path structure includes a first support rib having a first support rib body interfacing with the first cylinder block upper bore. The load path structure is configured to transfer a load from the first cylinder block upper bore along a non-linear path within the cylinder block body away from the first cylinder block upper bore.

In another set of embodiments, a cylinder block includes a cylinder block body, a load path structure, and a cylinder skirt portion. The cylinder block body defines a first cylinder block upper bore and a second cylinder block upper bore. The load path structure includes a first support rib and a second support rib. The first support rib has a first support rib body interfacing with the first cylinder block upper bore. The first support rib extends away from the cylinder block body in a direction that is parallel to the first cylinder block upper bore. The second support rib has a second support rib body interfacing with the second cylinder block upper bore. The second support rib extends away from the cylinder block body in a direction that is parallel to the second cylinder block upper bore. The cylinder skirt portion extends between the first support rib body and the second support rib body, the cylinder skirt portion being recessed relative to the first support rib and the second support rib.

BRIEF DESCRIPTION OF THE DRAWINGS

The details of one or more implementations are set forth in the accompanying drawing and the description below. Other features, aspects, and advantages of the disclosure will become apparent from the description, the drawing, and the claims, in which:

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and systems for increasing stiffnesses of cylinder blocks for internal combustion engine systems. The various concepts introduced above and discussed in greater detail below may be implemented in any of a number of ways, as the described concepts are not limited to any particular manner of implementation. Examples of specific implementations and applications are provided primarily for illustrative purposes.

I. Overview

An internal combustion engine may include a cylinder head and a cylinder block. The cylinder block may be coupled to the cylinder head using fasteners. The fasteners apply a force to the cylinder block. In order to strengthen the cylinder block and maintain integrity of the fasteners, additional material is often incorporated into the cylinder block near (e.g., around, proximate, etc.) the fasteners. Incorporating this additional material incurs increased cost and increases a weight of the cylinder block. Increasing the weight of the cylinder block may render the internal combustion engine less fuel efficient and may require more substantial support on a chassis, which renders the internal combustion engine less desirable.

Implementations described herein are related to an internal combustion engine system that includes a cylinder block with a load path structure that distributes loads within the cylinder block along non-linear paths. In various applications, the load path structure includes a number of support ribs. The load path structure distributes forces (e.g., via the support ribs) from one of the fasteners used to couple a cylinder head to the cylinder block. Through the use of the load path structure, a volume of the cylinder block (e.g., of the material from which the cylinder block is formed) is minimized. As a result, the cylinder block described herein may be produced at lower expense and may be relatively light.

II. Example Internal Combustion Engine System

Figure 1:
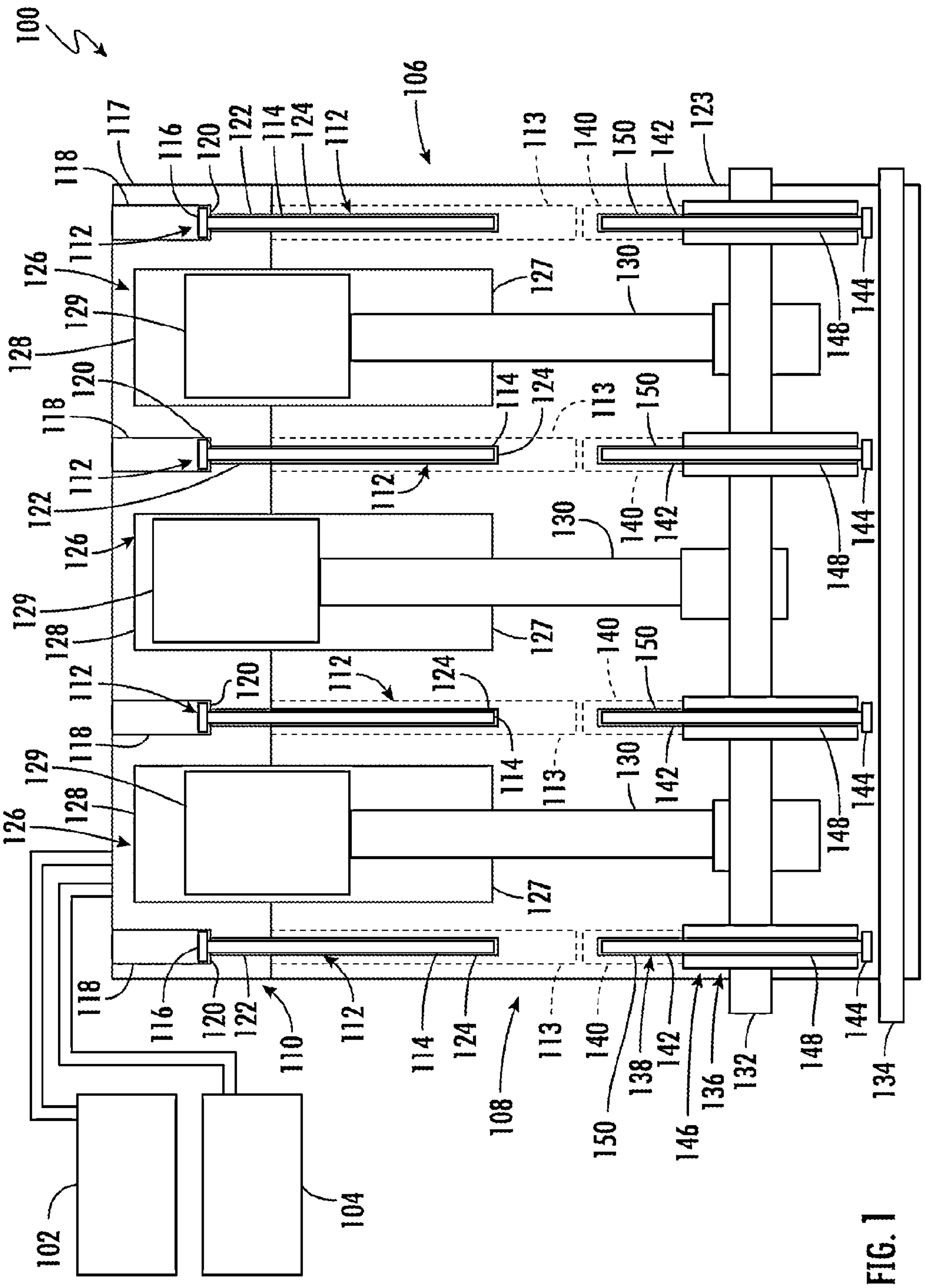
FIG. 1 is a block diagram of an example internal combustion engine system.

FIG. 1 depicts an example internal combustion engine system 100. The internal combustion engine system 100 may be, for example, a diesel internal combustion engine system, a gasoline internal combustion engine system, a hybrid internal combustion engine system, a propane internal combustion engine system, a dual-fuel internal combustion engine system, a natural gas internal combustion engine system, etc. The internal combustion engine system 100 is configured to combust a fuel (e.g., diesel fuel, gasoline, propane, natural gas, etc.) to produce energy that may be utilized by various outputs. For example, the internal combustion engine system 100 may produce energy that is utilized to drive a movement member (e.g., wheel, tread, propeller, impeller, turbine, rotor, etc.) or power a generator. The internal combustion engine system 100 may be implemented in a vehicle (e.g., truck, car, construction vehicle, freight vehicle, commercial vehicle, emergency vehicle, military vehicle, maritime vehicle, etc.).

The internal combustion engine system 100 includes a fuel source 102 (e.g., tank, reservoir, supply, line, etc.). The fuel source 102 is configured to contain a fuel (e.g., diesel fuel, gasoline, propane, natural gas, biodiesel fuel, etc.). The internal combustion engine system 100 also includes an air source 104 (e.g., intake, air box, etc.). The air source 104 receives air from an ambient environment (e.g., an environment surrounding the internal combustion engine system 100, etc.).

The internal combustion engine system 100 also includes a cylinder head-block assembly 106 (e.g., cylinder block and cylinder head, etc.). As is explained in more detail herein, the cylinder head-block assembly 106 receives the fuel from the fuel source 102 and the air from the air source 104, and combusts the fuel and the air to produce energy. While not shown in FIG. 1, it is understood that the cylinder head-block assembly 106 includes various components (e.g., fuel pumps, fuel injectors, throttles, conduits, valves, gaskets, lubricant systems, filters, wiring, etc.) that facilitate reception and combustion of the fuel and the air and production of the energy by the cylinder head-block assembly 106.

The cylinder head-block assembly 106 includes a cylinder block 108 (e.g., engine block, etc.). The cylinder block 108 may be coupled to a structure (e.g., chassis, motor mount, frame, etc.) and function to support the cylinder head-block assembly 106 relative to the structure. The cylinder head-block assembly 106 also includes a cylinder head 110 (e.g., head, etc.). The cylinder head 110 is coupled to the cylinder block 108.

In some applications where the cylinder block 108 is coupled to the structure, the cylinder head 110 is not coupled to the structure. In these applications, the cylinder head 110 may be removable from the cylinder block 108 while the cylinder block 108 remains coupled to the structure. As a result, internal components (e.g., gaskets, springs, rods, pistons, etc.) of the cylinder head-block assembly 106 may be serviced (e.g., repaired, replaced, cleaned, etc.). The cylinder head 110 may facilitate this servicing without having to decouple the cylinder block 108 from the structure.

As shown in FIG. 1, the cylinder head-block assembly 106 also includes a plurality of upper fasteners 112 (e.g., bolts, etc.). The upper fasteners 112 facilitate coupling of the cylinder head 110 to the cylinder block 108. The upper fasteners 112 cooperate with other components (e.g., a cylinder head gasket, scaling member, etc.) to provide a seal (e.g., an air tight seal, an exhaust tight seal, etc.) between the cylinder head 110 and the cylinder block 108.

While the cylinder head-block assembly 106 may include other fasteners that extend (e.g., project, protrude, etc.) within the cylinder block 108 and/or the cylinder head 110, the upper fasteners 112 collectively provide a significant majority (e.g., greater than 70%) of the force applied from the cylinder head 110 to the cylinder block 108.

As is explained in more detail herein, the upper fasteners 112 transfer forces (e.g., loads, etc.) to the cylinder head 110, and the cylinder head 110 transfers these forces to the cylinder block 108 along upper load paths 113 in the cylinder block 108. Each of the upper fasteners 112 is associated with one of the upper load paths 113. The cylinder block 108 and the cylinder head 110 are configured such that strength (e.g., resistance to vertical bending, resistant to lateral bending, torsional stiffness, bulkhead vertical stiffness, etc.) of the cylinder block 108 is increased along these the upper load paths 113. In this way, operation of the internal combustion engine system 100 may remain desirable for a prolonged period of time than. As a result of providing these upper load paths 113, the cylinder head-block assembly 106 may exhibit a relatively longer useful life.

Each of the upper fasteners 112 includes an upper fastener shaft 114 (e.g., shank, rod, etc.). The upper fastener shaft 114 extends within both the cylinder head 110 and the cylinder block 108 when the upper fastener 112 couples the cylinder head 110 and the cylinder block 108. As is explained in more detail herein, the upper fastener shaft 114 may threadably engage the cylinder head 110 and/or the cylinder block 108. For example, the upper fastener shaft 114 may include threads and the cylinder head 110 and/or the cylinder block 108 may include threads corresponding to and configured to engage with the threads of the upper fastener shaft 114.

Each of the upper fasteners 112 also includes an upper fastener head 116. As is explained in more detail herein, the upper fastener head 116 may be brought into contact with the cylinder head 110 when the cylinder head 110 is coupled to the cylinder block 108. The contact between the upper fastener head 116 and the cylinder head 110 transfers force between the upper fastener head 116, the cylinder head 110, and the cylinder block 108 along one of the upper load paths 113. As the upper fastener 112 is tightened into the cylinder block 108, additional force is transferred along one of the upper load paths 113.

The cylinder head 110 includes a cylinder head body 117 (e.g., frame, base, etc.). In various embodiments, the cylinder head body 117 includes a plurality of counterbores 118 (e.g., countersinks, etc.). The cylinder head body 117 is configured such that each of the counterbores 118 extends from an exterior surface of the cylinder head body 117 towards the cylinder block 108 when the cylinder head 110 is placed on the cylinder block 108. Each of the counterbores 118 is larger than at least one of the upper fastener heads 116 such that each of the counterbores 118 can receive one of the upper fastener heads 116 and therefore can receive one of the upper fasteners 112. For example, each of the counterbores 118 may be defined by a diameter that is larger than a diameter of at least one of the upper fastener heads 116. As utilized herein, the term "diameter" connotes a length of a chord passing through a center point of a shape (e.g., square, rectangle, hexagon, circle, ellipse, pentagon, triangle, etc.).

In various embodiments, the cylinder head body 117 also includes a plurality of counterbore faces 120 (e.g., surfaces, etc.). Each of the counterbore faces 120 is positioned within one of the counterbores 118. The counterbore faces 120 may be disposed along one or more planes that is parallel to a surface (e.g., top surface, etc.) of the cylinder block 108 that interfaces with a surface (e.g., bottom surface, etc.) of the cylinder head 110. Each of the upper fastener heads 116 contacts one of the counterbore faces 120 such that force from the upper fasteners 112 is transferred to the cylinder head 110. In some embodiments, the cylinder head body 117 does not include the counterbores 118 or the counterbore faces 120.

The cylinder head body 117 also includes a plurality of cylinder head apertures 122 (e.g., holes, etc.). Each of the cylinder head apertures 122 is aligned with one of the counterbores 118 and is configured to receive the upper fastener shaft 114 of one of the upper fasteners 112.

In some embodiments, one or more of the cylinder head apertures 122 is threaded. For example, all of the cylinder head apertures 122 may be threaded. In these embodiments, the cylinder head apertures 122 that are threaded are configured to threadably engage the upper fasteners 112.

The cylinder block 108 also includes a cylinder block body 123 (e.g., frame, base, etc.). The cylinder block body 123 includes a plurality of cylinder block upper bores 124 (e.g., holes, head bolt boss, etc.). Each of the cylinder block upper bores 124 is configured to be aligned with one of the cylinder head apertures 122 when the cylinder head 110 is placed on top of the cylinder block 108. Specifically, the cylinder head 110 may be placed on top of the cylinder block 108 such that each of the cylinder head apertures 122 is aligned with one of the cylinder block upper bores 124. Additionally, in various embodiments, each of the cylinder block upper bores 124 is aligned with at least one other of the cylinder block upper bores 124.

In some embodiments, one or more of the cylinder block upper bores 124 is threaded. For example, all of the cylinder block upper bores 124 may be threaded. In these embodiments, the cylinder block upper bores 124 that are threaded are configured to threadably engage the upper fasteners 112.

Each of the upper load paths 113 is centered on one of the cylinder block upper bores 124 and extends from the cylinder block upper bore 124 away from the cylinder head 110. For example, the upper load paths 113 may extend beneath the cylinder block upper bores 124.

The cylinder head-block assembly 106 also defines at least one cylinder 126 (e.g., combustion chamber, etc.). Each cylinder 126 receives the fuel from the fuel source 102 and the air from the air source 104 and provides exhaust after a combustion of the air and the fuel occurs within the cylinder 126. In various embodiments, the cylinder head-block assembly 106 includes a plurality of cylinders 126 (e.g., two cylinders 126, four cylinders 126, five cylinders 126, six cylinders 126, seven cylinders 126, eight cylinders 126, nine cylinders 126, ten cylinders 126, twelve cylinders 126, fourteen cylinders 126, etc.).

Each of the cylinders 126 includes a cylinder block cylinder portion 127 (e.g., lower portion, etc.). Each of the cylinder block cylinder portions 127 is contained within the cylinder block 108. In some embodiments, each of the cylinders 126 also includes a cylinder head cylinder portion 128 (e.g., upper portion, etc.). Each of the cylinder head cylinder portions 128 is contained within the cylinder head 110. In some embodiments, each of the cylinders 126 includes the cylinder block cylinder portion 127 and the cylinder head cylinder portion 128. In other embodiments, one or more of the cylinders 126 does not include the cylinder head cylinder portion 128 and only includes the cylinder block cylinder portion 127 (e.g., the cylinder 126 does not extend into the cylinder head 110, etc.).

In various embodiments, pairs of the cylinder block upper bores 124 are disposed adjacent one of the cylinder block cylinder portions 127. For example, two of the cylinder block upper bores 124 are disposed adjacent one of the cylinder block cylinder portions 127 and another two of the cylinder block upper bores 124 are disposed adjacent another of the cylinder block cylinder portions 127.

The internal combustion engine system 100 also includes a piston 129 for each of the cylinders 126. For example, if the cylinder head-block assembly 106 defines four cylinders 126, the internal combustion engine system 100 includes four pistons 129. Each piston 129 is received within one of the cylinders 126 and is selectively repositioned (e.g., translated, slid, etc.) within the cylinder 126 during a combustion cycle occurring within the cylinder 126.

The cylinder 126 and the piston 129 are sized to have diameters that are within a relatively small percentage (e.g., less than 1%, less than 0.5%, etc.) of one another. Movement of the piston 129 within the cylinder 126 is facilitated by this difference. Additionally, it is desirable for this difference to be as small as possible in order to increase energy provided to the connecting rod 130.

In order to enable the difference between the diameter of the cylinder 126 and the diameter of the piston 129 to be as small as possible, the internal combustion engine system 100 circulates a lubricant (e.g., oil, etc.) between the cylinder 126 and the piston 129. The lubricant may provide both a fluid seal between the cylinder 126 and the piston 129 as well as a mechanism for minimizing friction between the cylinder 126 and the piston 129.

The internal combustion engine system 100 also includes a connecting rod 130 for each of the pistons 129. For example, if the cylinder head-block assembly 106 includes four pistons 129, the internal combustion engine system 100 also includes four of the connecting rods 130. Each of the connecting rods 130 is coupled to one of the pistons 129 and receives energy from movement of the piston 129 by combustion within the cylinder 126 associated with the piston 129.

The internal combustion engine system 100 also includes a crankshaft 132. The crankshaft 132 receives energy from each of the connecting rods 130 and provides the energy to an output (e.g., driveshaft, etc.). The internal combustion engine system 100 also includes a camshaft 134. The camshaft 134 receives energy from the crankshaft 132 (e.g., via a pulley, via gears, etc.). The camshaft 134 provides energy to components (e.g., valves, tappets, pushrods, rockers, etc.) of the internal combustion engine system 100 that facilitate introduction of air and fuel.

In various embodiments, such as is shown in FIG. 1, the cylinder head-block assembly 106 is configured such that some of the upper fasteners 112 are located between adjacent pairs of the cylinder block cylinder portions 127 of the cylinders 126, and therefore between adjacent pairs of the pistons 129. These upper fasteners 112 may enhance sealing between the cylinder head 110 and the cylinder block 108 at these locations. To facilitate this relationship, the cylinder block body 123 may be configured such that some of the cylinder block upper bores 124 are located between adjacent pairs of the cylinder block cylinder portions 127.

Additionally, some of the upper fasteners 112 are located near an end (e.g., lateral end, etc.) of the cylinder block 108. These upper fasteners 112 are not located between adjacent pairs of the cylinder block cylinder portions 127. Instead, these upper fasteners 112 are located between the end of the cylinder block 108 and an adjacent one of the cylinder block cylinder portions 127.

The internal combustion engine system 100 also includes a plurality of main caps 136 (e.g., engine block main caps, main bearing caps, etc.). Each of the main caps 136 is configured to be coupled to the cylinder block 108. Additionally, each of the main caps 136 is configured to cooperate with the cylinder block 108 to retain a bearing (e.g., bearing ring assembly, etc.) that receives a portion (e.g., shaft portion, etc.) of the crankshaft 132. As a result, each of the main caps 136 is configured to receive a portion of the crankshaft 132 such that the portion of the crankshaft 132 can rotate relative to the main cap 136 (e.g., within a bearing held by the main cap 136, etc.).

The cylinder head-block assembly 106 also includes a plurality of lower fasteners 138 (e.g., bolts, etc.). The lower fasteners 138 facilitate coupling of the main caps 136 to the cylinder block 108. As is explained in more detail herein, the lower fasteners 138 transfer forces to the main caps 136, and the main caps 136 transfer these forces to the cylinder block 108 along lower load paths 140 in the cylinder block 108. Each of the lower fasteners 138 is associated with one of the lower load paths 140.

In various embodiments, the cylinder block 108 and the main caps 136 are configured such that strength (e.g., resistance to vertical bending, resistant to lateral bending, torsional stiffness, bulkhead vertical stiffness, etc.) of the cylinder block 108 is increased along these the lower load paths 140. In this way, operation of the internal combustion engine system 100 may remain desirable for a prolonged period of time. As a result of providing these lower load paths 140, the cylinder head-block assembly 106 may exhibit a relatively longer useful life.

Each of the lower fasteners 138 includes a lower fastener shaft 142 (e.g., shank, rod, etc.). The lower fastener shaft 142 extends within one of the main caps 136 and the cylinder block 108 when the lower fastener 138 couples the main cap 136 and the cylinder block 108. As is explained in more detail herein, the lower fastener shaft 142 may threadably engage the main cap 136 and/or the cylinder block 108. For example, the lower fastener shaft 142 may include threads and the main cap 136 and/or the cylinder block 108 may include threads corresponding to and configured to engage with the threads of the lower fastener shaft 142.

Each of the lower fasteners 138 also includes a lower fastener head 144. As is explained in more detail herein, the lower fastener head 144 may be brought into contact with one of the main cap 136 when the main cap 136 is coupled to the cylinder block 108. The contact between the lower fastener head 144 and the main cap 136 transfers force between the lower fastener head 144, the main cap 136, and the cylinder block 108 along one of the lower load paths 140. As the lower fastener 138 is tightened into the cylinder block 108, additional force is transferred along one of the lower load paths 140.

Each of the main caps 136 includes a main cap body 146 (e.g., frame, base, etc.). In various embodiments, the main cap body 146 includes a plurality of main cap apertures 148 (e.g., countersinks, etc.). The main cap body 146 is configured such that each of the main cap apertures 148 extends from an exterior surface of the main cap body 146 towards the cylinder block 108 when the main cap 136 is placed on the cylinder block 108. Each of the main cap apertures 148 is smaller than at least one of the lower fastener heads 144 and is configured to receive the lower fastener shaft 142 of one of the lower fasteners 138. For example, each of the main cap apertures 148 may be defined by a diameter that is less than a diameter of at least one of the lower fastener heads 144. Each of the lower fastener heads 144 contacts the main cap body 146 such that force from the lower fasteners 138 is transferred to the main caps 136 and therefore to the cylinder block 108.

In some embodiments, one or more of the main cap apertures 148 is threaded. For example, all of the main cap apertures 148 may be threaded. In these embodiments, the main cap apertures 148 that are threaded are configured to threadably engage the lower fasteners 138.

The cylinder block body 123 also includes a plurality of cylinder block lower bores 150 (e.g., holes, etc.). Each of the cylinder block lower bores 150 is configured to be aligned with one of the main cap apertures 148 when the main cap 136 is placed on the cylinder block 108. Specifically, the main caps 136 may be placed on the cylinder block 108 such that each of the main cap apertures 148 is aligned with one of the cylinder block lower bores 150.

Additionally, in various embodiments, each of the cylinder block lower bores 150 is aligned with at least one other of the cylinder block lower bores 150. In various embodiments, two or more of the cylinder block upper bores 124 are aligned along a first direction and at least two of the cylinder block lower bores 150 are aligned along a second direction that is parallel to the first direction.

In some embodiments, one or more of the cylinder block lower bores 150 is threaded. For example, all of the cylinder block lower bores 150 may be threaded. In these embodiments, the cylinder block lower bores 150 that are threaded are configured to threadably engage the lower fasteners 138.

Each of the lower load paths 140 is centered on one of the cylinder block lower bores 150 and extends from the cylinder block lower bore 150 away from the main caps 136. For example, the lower load paths 140 may extend above the cylinder block lower bores 150. In various embodiments, the cylinder block 108 is configured such that each of the cylinder block lower bores 150 is aligned with one of the cylinder block upper bores 124. As a result, the upper load paths 113 are aligned with the lower load paths 140. This alignment may enable the cylinder block 108 to be strengthened along less locations than would be desirable without this alignment. As a result, a mass of the cylinder block 108 may be reduced, which may be desirable in some applications.

Figure 2:
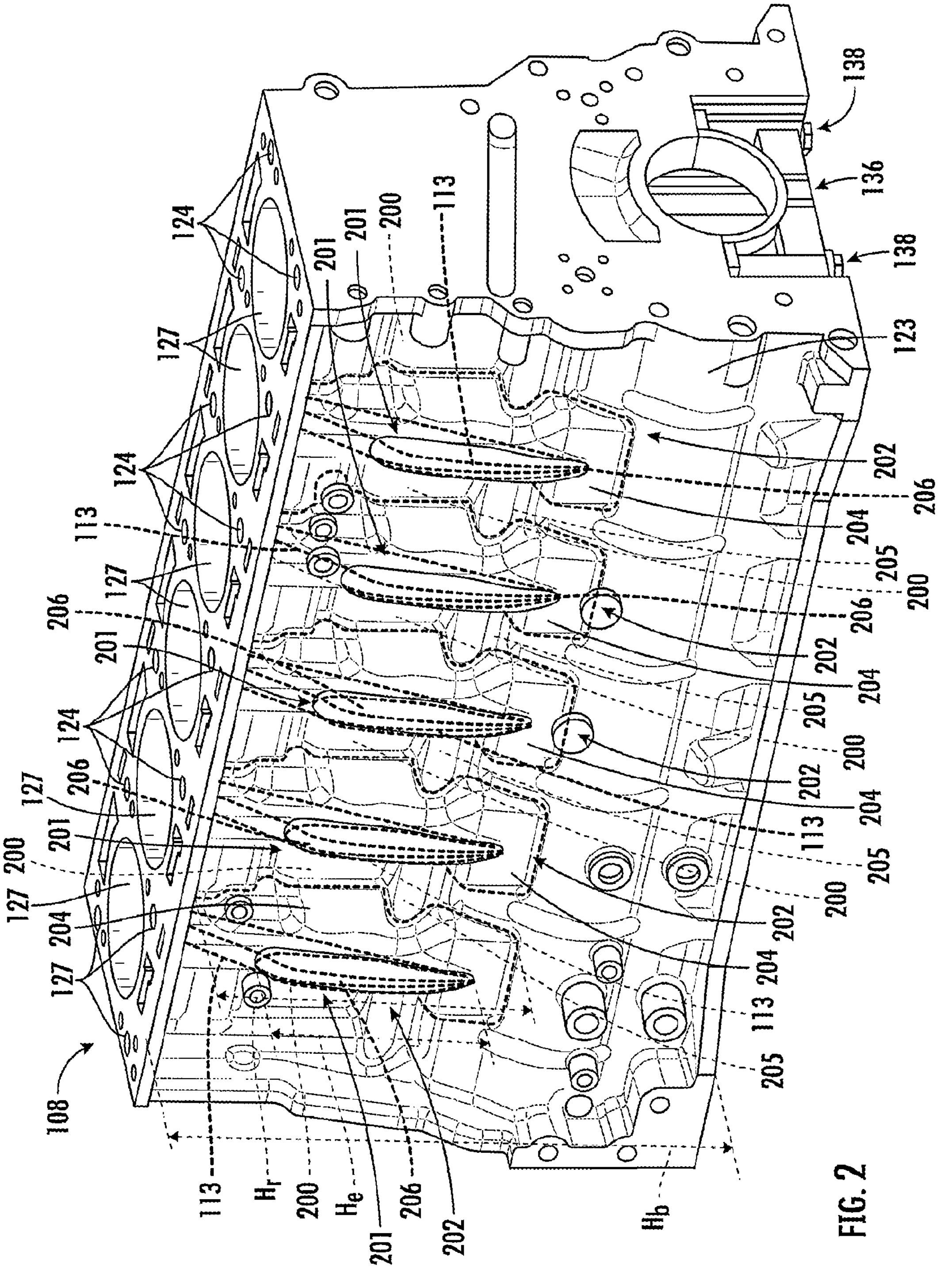
FIG. 2 is a perspective view of an example cylinder block.
Figure 3:
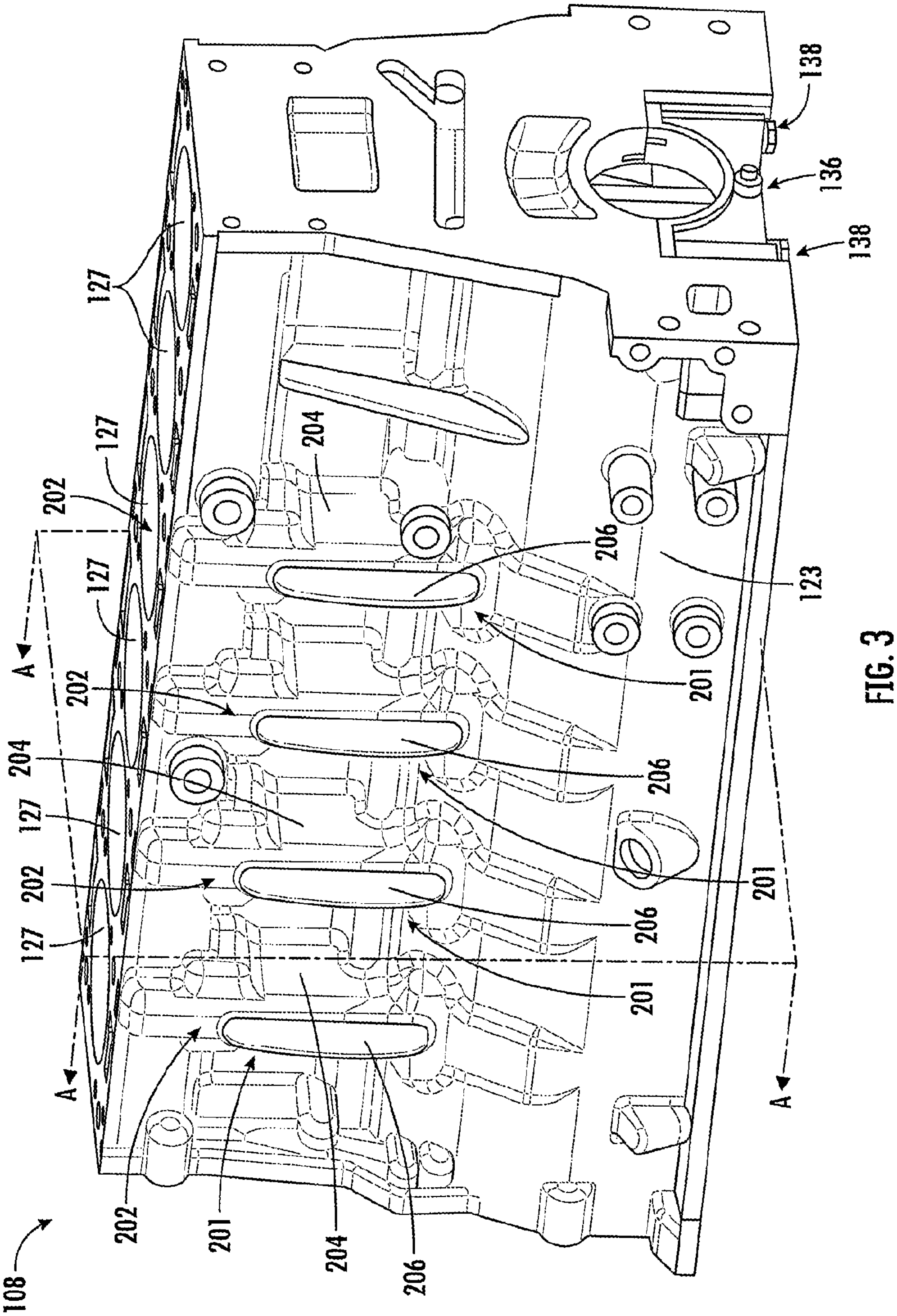
FIG. 3 is another perspective view of the cylinder block shown in FIG. 2.
Figure 4:
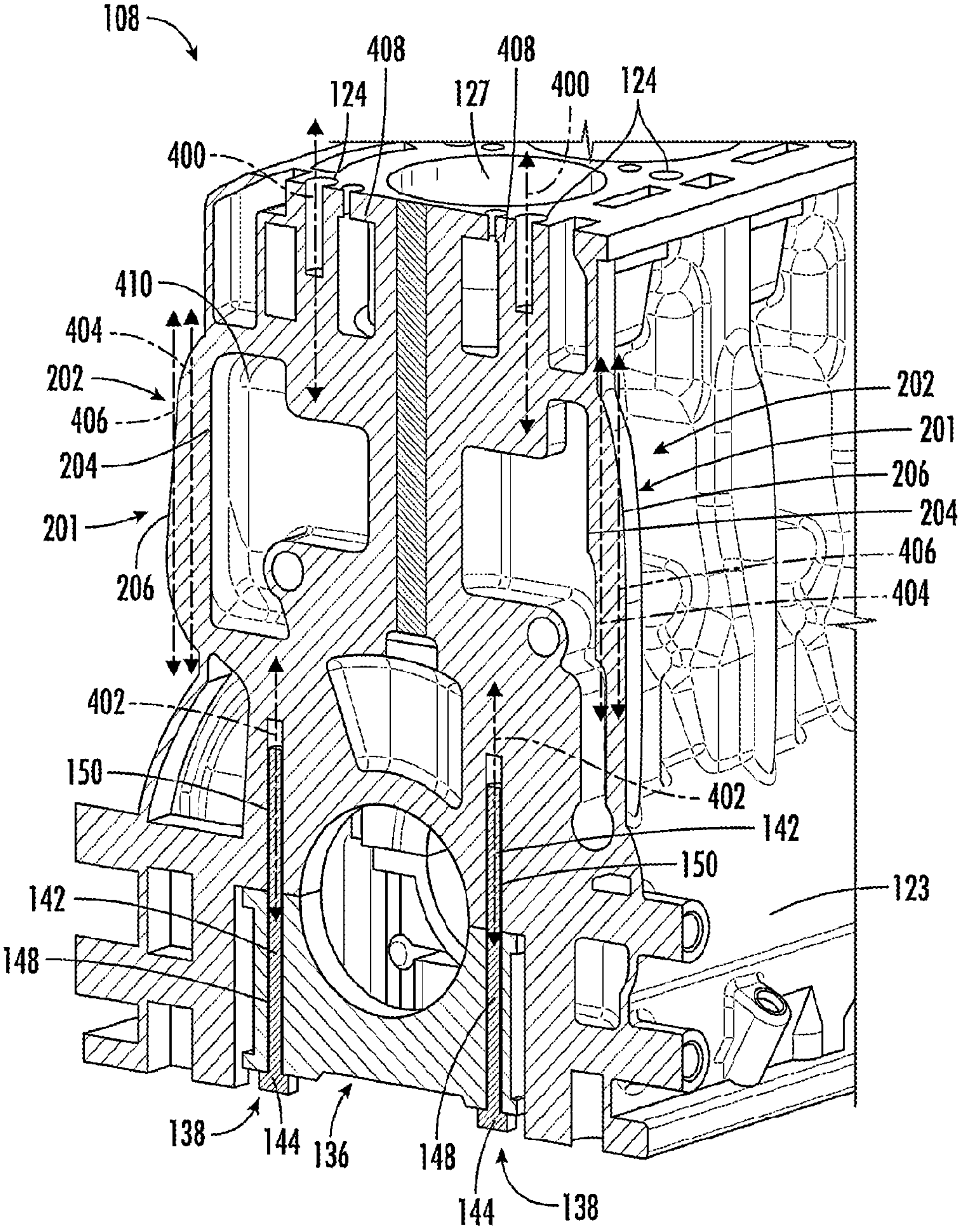
FIG. 4 is a cross-sectional view of the cylinder block shown in FIG. 3 taken along plane A-A.

FIGS. 2-4 illustrate the cylinder block 108 according to various embodiments. The cylinder block 108 includes a plurality of cylinder skirt portions 200. Each of the cylinder skirt portions 200 extends alongside one of the cylinder block cylinder portions 127. As is explained in more detail herein, the cylinder block 108 is configured such that the upper load paths 113 and/or the lower load paths 140 do not extend across the cylinder skirt portions 200.

As a result, the cylinder skirt portions 200 are capable of being relatively thin, which decreases a mass of the cylinder block 108. This is beneficial, as decreasing the mass of the cylinder block 108 reduces weight of the internal combustion engine system 100, which may enable a vehicle having the internal combustion engine system 100 to operate at relatively greater fuel efficiencies. Additionally, decreasing a weight of the cylinder block 108 may decrease the amount of material required to produce the cylinder block 108, which may decrease a cost associated with producing the cylinder block 108.

The cylinder block 108 also includes a load path structure 201 (e.g., support structure, etc.). The load path structure 201 is configured to distribute forces from the upper fasteners 112 and/or the lower fasteners 138 within the cylinder block 108 along a non-linear (e.g., arched, curved, elongated, etc.) load path within the cylinder block 108. For example, the load path structure 201 may distribute the force from the upper load path 113 and/or the lower load path 140 outward (e.g., towards a side of the cylinder block, etc.) along an arched path. Each of the non-linear load paths extends away from one of the cylinder block upper bores 124. These non-linear load paths provide for additional dissipation of forces compared to linear load paths.

The load path structure 201 also includes a plurality of support ribs 202 (e.g., columns, etc.). Each of the support ribs 202 includes a support rib body 204. The support rib body 204 is disposed between two of the cylinder skirt portions 200. In other words, a first cylinder skirt portion 200 is contiguous with the support rib body 204 (and therefore one of the support ribs 202) and a second cylinder skirt portion 200 is contiguous with the same support rib body 204 (and therefore the same support rib 202). The support rib body 204 extends outwardly (e.g., away from the cylinder block cylinder portion 127) relative to the cylinder skirt portions 200.

Similarly, the cylinder skirt portion 200 is recessed relative to the support rib body 204 of the first support rib 202 (that is contiguous with the cylinder skirt portion 200) and the support rib body 204 of the second support rib 202 (that is contiguous with the cylinder skirt portion 200). In various embodiments, such as is shown in FIG. 4, the support rib bodies 204 are solid. In other embodiments, the support rib bodies 204 are hollow. By virtue of the support rib bodies 204 being hollow, weights of the support ribs 202 may be decreased compared to embodiments where the support rib bodies 204 are not hollow, which may decrease a weight of the cylinder block 108. Some of the support ribs 202 are disposed along one side (e.g., a first side, an exhaust side, etc.) of the cylinder block 108 while others of the support ribs 202 are disposed along the other side (e.g., a second side, an intake side, etc.) of the cylinder block 108. Thus, some of the support ribs 202 are disposed on the same side of the cylinder block 108 while others of the support ribs 202 are disposed on opposite sides of the cylinder block 108.

In various embodiments, a cylinder block 108 includes a cylinder block body 123. The cylinder block body 123 defines a first cylinder block upper bore 124. A load path structure 201 includes a first support rib 202. The first support rib 202 has a first support rib body 204 interfacing with the first cylinder block upper bore 124. The load path structure 201 is configured to transfer a load from the first cylinder block upper bore 124 along a non-linear path within the cylinder block body 123 away from the first cylinder block upper bore 124.

In various embodiments, a cylinder block 108 includes a cylinder block body 123. The cylinder block body 123 defines a first cylinder block upper bore 124 and a second cylinder block upper bore 124. A load path structure 201 includes a first support rib 202 and a second support rib 202. The first support rib 202 has a first support rib body 204. The first support rib body 204 interfaces with the first cylinder block upper bore 124. The first support rib 202 extends away from the cylinder block body 123 in a direction that is parallel to the first cylinder block upper bore 124. The second support rib 202 has a second support rib body 204. The second support rib body 204 interfaces with the second cylinder block upper bore 124. The second support rib 202 extends away from the cylinder block body 123 in a direction that is parallel to the second cylinder block upper bore 124. The cylinder skirt portion 200 extends between the first support rib body 204 and the second support rib body 204. The cylinder skirt portion 200 is recessed relative to the first support rib 202 and the second support rib 202.

In various embodiments, two of the support ribs 202 that are disposed along opposite sides of the cylinder block 108 are aligned along an axis that extends between adjacent cylinder skirt portions 200.

The support rib bodies 204 create non-linear load paths within which the forces from the upper fasteners 112 and/or the lower fasteners 138 are distributed. Specifically, each of the support ribs 202 transfer forces from one of the upper fasteners 112 away from the cylinder head 110. As used herein, "non-linear" means not along a straight line, recognizing that some non-linear lines may appear straight when viewed along one or more planes. In various embodiments, the load path structure 201 includes other structures that additionally or alternatively provide non-linear load paths. For example, the load path structure 201 may include braces, mounts (e.g., mounting locations for components associated with the internal combustion engine system 100, etc.), and other structures which provide non-linear load paths.

Each of the support rib bodies 204 includes two ends, a first end and a second end opposite the first end. The first end is disposed adjacent a top surface of the cylinder block 108 and is in confronting relation with the cylinder head 110. The second end may be disposed adjacent the camshaft 134. For example, the camshaft 134 may be disposed below the second ends and a portion (e.g., rounded portion, barrel portion, etc.) of the cylinder block 108 covering the camshaft 134 may be contiguous with the second ends. The second end may be located at various distances from the top surface of the cylinder block 108.

As a result, each of the support rib bodies 204 has a height $H_r$ measured along a plane that is orthogonal to the top surface of the cylinder block 108 and along which the support rib bodies 204 extend. The cylinder block 108 has a height $H_b$ along this plane, where the height $H_b$ is from the top surface of the cylinder block 108 to the bottom surface of the cylinder block 108. The height $H_b$ may be result of the height $H_b$ and lengths of the upper fastener 112 and/or the lower fastener 138.

In various embodiments, the support rib bodies 204 are configured such that the height $H_r$ is between $0.2H_b$ and $0.8H_b$, inclusive. In some embodiments, the support rib bodies 204 are configured such that the height $H_r$ is between $0.4H_b$ and $0.6H_b$, inclusive. For example, the support rib bodies 204 may be configured such that the height $H_r$ is approximately equal to $0.5H_b$. The lengths of the support rib bodies 204 may be related to the ability of the support rib bodies 204 to transfer forces from the upper fasteners 112. In some embodiments, the support rib bodies 204 are configured such that the height $H_r$ for each of the support rib bodies 204 is approximately the same. In other embodiments, the support rib bodies 204 are configured such that some of the heights $H_r$ are different.

The cylinder block 108 has two sides, a cold side (e.g., intake side, etc.) and a hot side (e.g., exhaust side, etc.). FIG. 2 illustrates one side of the cylinder block 108 and FIG. 3 illustrates another side of the cylinder block 108. The cold side is disposed adjacent intake valves that provide air into the cylinder head-block assembly 106. The hot side is disposed adjacent exhaust valves that provide exhaust from the cylinder head-block assembly 106. In some embodiments, the cylinder block 108 includes a first plurality of the support ribs 202 on the cold side and a second plurality of the support ribs 202 on the hot side. The number of the support ribs 202 on the cold side may be equal to the number of the support ribs 202 on the hot side. In other embodiments, the cylinder block 108 only includes the support ribs 202 on the hot side or only includes the support ribs 202 on the cold side.

At least some of the cylinder skirt portions 200 cooperate with adjacent ones of the support rib bodies 204 (and therefore two of the support ribs 202) to form a cylinder wall cavity 205. The cylinder wall cavity 205 is contiguous with two of the support rib bodies 204 and the cylinder skirt portion 200 positioned between the two support rib bodies 204. The cylinder wall cavity 205 provides mass savings for the cylinder block 108.

Additionally, each of the support rib bodies 204 interfaces with one of the cylinder block upper bores 124, as shown in FIG. 4. As a result, the upper load path 113 extends from the cylinder block upper bores 124 directly into the support rib bodies 204. By avoiding a circuitous routing of the forces, the support rib bodies 204 decrease stress accumulations within the cylinder head 110 and ensure desirable operation of the cylinder head 110 is maintained. In various embodiments, each of the support rib bodies 204 additionally interfaces with one of the cylinder block lower bores 150. As a result, the lower load path 140 extends from the cylinder block lower bores 150 directly into the support rib bodies 204.

As shown in FIG. 4, the cylinder block upper bores 124 do not extend into the support rib bodies 204. Instead, the cylinder block upper bores 124 terminate above the support rib bodies 204. This enables a shape and configuration of the support rib bodies 204 to desirably transfer load from the upper fasteners 112 to the structure to which the cylinder block 108 is coupled.

In various embodiments, each of the support rib bodies 204 interfaces with only one of the cylinder block upper bores 124. As a result, only one of the upper fasteners 112 is contained within each of the support rib bodies 204. In these embodiments, the support rib bodies 204 do not extend from one of the cylinder block upper bores 124 to another of the cylinder block upper bores 124.

Each of the upper load paths 113 extends within one of the support rib bodies 204 because the support rib bodies 204 project from the cylinder skirt portions 200 and because the support rib bodies 204 interface with the cylinder block upper bores 124. As a result, a shape and configuration of the support rib bodies 204 influences transfer of force to the cylinder block 108. Each of the lower load paths 140 may extend within one of the support rib bodies 204 because the support rib bodies 204 project from the cylinder skirt portions 200 when the support rib bodies 204 interface with the cylinder block lower bores 150.

Each of the support rib bodies 204 includes sides that are contiguous with the cylinder skirt portions 200 and that extend away from the cylinder skirt portions 200. In some embodiments, portions of the sides of the support rib bodies 204 may extend at an angle from the cylinder skirt portions 200 where the angle is between 70 degrees and 110 degrees, inclusive. For example, portions of the sides of the support rib bodies 204 may extend orthogonally (e.g., at 90 degrees, etc.) from the cylinder skirt portions 200. In some embodiments, portions of the sides of the support rib bodies 204 may be vertical (e.g., at a zero degree angle relative to the cylinder skirt portions 200, etc.) or horizontal (e.g., at a 90 degree angle relative to the cylinder skirt portions 200, etc.).

Borders (e.g., junctures, etc.) between the support rib bodies 204 and the cylinder skirt portions 200 may be rounded (e.g., filleted, etc.). In other words, transitions between the support rib bodies 204 and the cylinder skirt portions 200 are intentionally elongated so as to be more gradual. This rounding may mitigate formation of stress concentrations near these borders.

Each of the support ribs 202 also includes a linear extension 206 (e.g., beam, etc.). Each of the linear extensions 206 extends outwardly from one of the support rib bodies 204. Each of the linear extensions 206 interface with one of the cylinder block upper bores 124 and provides additional thickness to the support ribs 202 over the cylinder block upper bores 124. In this way, the linear extension 206 provides for additional transfer of force from the upper fasteners 112 to the cylinder block 108.

Each of the linear extensions 206 includes two ends, a first end and a second end opposite the first end. The first end is disposed adjacent a top surface of the cylinder block 108 and is in confronting relation with the cylinder head 110. The second end may be located at various distances from the top surface of the cylinder block 108. As a result, each of the linear extensions 206 has a height He measured along a plane that is orthogonal to the top surface of the cylinder block 108 and along which the linear extensions 206 extend. The height $H_b$ (from the top surface of the cylinder block 108 to the bottom surface of the cylinder block 108) may be measured along this plane. In various embodiments, the linear extensions 206 are configured such that the height He is between $0.2H_b$ and $0.8H_b$, inclusive. In some embodiments, the linear extensions 206 are configured such that the height He is between $0.4H_b$ and $0.6H_b$, inclusive. For example, the linear extensions 206 may be configured such that the height He is approximately equal to $0.5H_b$.

The lengths of the linear extensions 206 may be related to the ability of the linear extensions 206 to transfer forces from the upper fasteners 112. The height $H_r$ (of the support rib bodies 204) may also be measured along this plane. In various embodiments, the linear extensions 206 are configured such that the height He is between 0.4 $H_r$ and 0.9 $H_r$, inclusive. In some embodiments, the linear extensions 206 are configured such that the height He is between 0.5 $H_r$ and 0.8 $H_r$, inclusive. For example, the linear extensions 206 may be configured such that the height He is approximately equal to 0.7 $H_r$. In some embodiments, the linear extensions 206 are configured such that the height He for each of the linear extensions 206 is approximately the same. In other embodiments, the linear extensions 206 are configured such that some of the heights He are different.

In various embodiments, all surfaces of the support rib bodies 204 have a positive draft angle or a zero draft angle, where the pull direction that defines the draft angle is normal to and extends away from one or more of the cylinder skirt portions 200 that is disposed along a plane. In other words, none of the portions of the support rib bodies 204 are angled towards the one or more cylinder skirt portions 200. Instead, all portions of the support rib bodies 204 are normal to the one or more cylinder skirt portions 200 or are angled away from the one or more cylinder skirt portions 200. Of course, some portions of the support rib bodies 204 may be normal to the cylinder skirt portions 200, while other portions of the support rib bodies 204 may be angled away from the cylinder skirt portions 200.

As shown in FIG. 4, each of the cylinder block upper bores 124 is centered on a cylinder bore upper axis 400 (e.g., center axis, central axis, etc.). For example, where the cylinder block upper bores 124 are circular, the cylinder bore upper axis 400 each extend through centroids of cylinder block upper bores 124. In some embodiments, the cylinder bore upper axes 400 for all of the cylinder block upper bores 124 are parallel.

Each of the cylinder block lower bores 150 is centered on a cylinder bore lower axis 402 (e.g., center axis, central axis, etc.). For example, where the cylinder block lower bores 150 are circular, the cylinder bore lower axis 402 each extend through centroids of cylinder block lower bores 150. In some embodiments, the cylinder bore lower axes 402 for all of the cylinder block lower bores 150 are parallel. In some embodiments, the cylinder bore lower axis 402 for one of the cylinder block lower bores 150 is parallel to the cylinder block upper axis 400 for one of the cylinder block upper bores 124.

Each of the support rib bodies 204 is centered on a support rib axis 404 (e.g., center axis, central axis, etc.). Each of the support rib bodies 204 is configured such that the support rib axis 404 of the support rib body 204 extends in a direction that is parallel to at least one of the cylinder bore upper axes 400 and/or at least one of the cylinder bore lower axes 402.

As shown in FIG. 4, a first of the support rib bodies 204 is centered on a first support rib axis 404 and the first support rib axis 404 extends in a direction that is parallel to at least one of the cylinder bore upper axes 400 and/or at least one of the cylinder bore lower axes 402. Additionally, the support rib bodies 204 are configured such that the support rib axis 404 of one of the support rib bodies 204 is parallel to the support rib axes 404 of adjacent ones of the support rib bodies 204. For example, where a first support rib body 204 is positioned between a second support rib body 204 and a third support rib body 204, the support rib axis 404 of the first support rib body 204 is parallel to each of the support rib axes 404 of the second support rib body 204 and the third support rib body 204. As a result of these configurations, each of the support rib bodies 204 does not extend towards another of the support rib bodies 204. Instead, each of the support rib bodies 204 is intentionally separated from others of the support rib bodies 204 (e.g., by the cylinder skirt portions 200, etc.).

In some embodiments, the support rib body 204 of each of the support ribs 202 is symmetrical about a plane that extends along the support rib axis 404 of the support rib body 204 and that bisects the support rib body 204. This symmetry may mitigate formation of stress concentrations within the support rib body 204.

In various embodiments, each of the support rib bodies 204 does not include any portion (e.g., projection, protuberance, extension, etc.) that extends towards another of the support rib bodies 204. Instead, a spacing (e.g., gap, etc.) between each of the support rib bodies 204 and adjacent ones of the support rib bodies 204 is constant along the support rib body 204. For example, a spacing between a first support rib body 204 and a second support rib body 204 is constant along the support rib axis 404 of the first support rib body 204 and along the support rib axis 404 of the second support rib body 204.

The linear extensions 206 each extend linearly along one of the support rib bodies 204. Similar to the support rib bodies 204, each of the linear extensions 206 is centered on a linear extension axis 406 (e.g., center axis, central axis, etc.). Each of the linear extension axes 406 is configured such that the linear extension axis 406 of the linear extension 206 extends in a direction that is parallel to at least one of the cylinder bore upper axes 400 and/or at least one of the cylinder bore lower axes 402.

As shown in FIG. 4, a first of the linear extensions 206 is centered on a first linear extension axis 406 and the first linear extension axis 406 extends in a direction that is parallel to at least one of the cylinder bore upper axes 400 and/or at least one of the cylinder bore lower axes 402. Additionally, the linear extensions 206 are configured such that the linear extension axis 406 of one of the linear extensions 206 is parallel to the linear extension axes 406 of adjacent ones of the linear extensions 206. For example, where a first linear extension 206 is positioned between a second linear extension 206 and a third linear extension 206, the linear extension axis 406 of the first linear extension 206 is parallel to each of the linear extension axes 406 of the second linear extension 206 and the third linear extension 206. As a result of these configurations, each of the linear extensions 206 does not extend towards another of the linear extensions 206. Instead, each of the linear extensions 206 is intentionally separated from others of the linear extensions 206 (e.g., by the cylinder skirt portions 200, etc.).

In some embodiments, the linear extension 206 of each of the support ribs 202 is symmetrical about a plane that extends along the linear extension axis 406 of the linear extension 206 and that bisects the linear extension 206. This symmetry may mitigate formation of stress concentrations within the linear extension 206.

In various embodiments, each of the linear extensions 206 does not include any portion (e.g., projection, protuberance, extension, etc.) that extends towards another of the linear extensions 206. Instead, a spacing between each of the linear extensions 206 and adjacent ones of the linear extensions 206 is constant along the linear extension 206. For example, a spacing between a first linear extension 206 and a second linear extension 206 is constant along the linear extension axis 406 of the first linear extension 206 and along the linear extension axis 406 of the second linear extension 206.

FIG. 4 shows that two of the linear extensions 206 are aligned across the cylinder block 108. As a result, two of the support ribs 202 are aligned across the cylinder block 108. In some embodiments, the cylinder block 108 is configured such that each of the linear extensions 206 is aligned with another of the linear extensions 206 across the cylinder block. Thus, each of the support ribs 202 is aligned with another of the support ribs 202 across the cylinder bock 108. This alignment of the linear extensions 206 is facilitated by an alignment of the cylinder block upper bores 124.

Each of the upper load paths 113 extends through one of the linear extensions 206. The linear extensions 206 provide increased strength to the cylinder block 108. Additionally, the linear extensions 206 enable each of the upper load paths 113 to provide an alternate load path within the cylinder block 108 that enables packaging of critical features away from a prime load path (e.g., a straight line extending from one of the upper fasteners 112 to one of the lower fasteners 138).

When the support rib bodies 204 are aligned with the cylinder block lower bores 150, each of the lower load paths 140 extends through one of the linear extensions 206. The linear extensions 206 enable each of the lower load paths 140 to provide an alternate load path within the cylinder block 108 that enables packaging of critical features away from a prime load path.

Each of the linear extension 206 includes a top surface. In various embodiments, the linear extensions 206 are each configured such that the top surface is rounded. This rounding may mitigate formation of stress concentrations near the top surface. With this rounding, the linear extensions 206 may be substantially arc-shaped, as shown in FIGS. 2-4. In some embodiments, each of the linear extensions 206 has a radius of curvature that is approximately equal to (e.g., within 5% of, equal to, etc.) between 0.25 inches (in) and 1 in, inclusive (e.g., 0.2375 in, 0.25 in, 0.5 in, 0.75 in, 1 in, 1.05 in, etc.).

In some embodiments, at least a portion of the top surface of at least one of the linear extensions 206 is not rounded. For example, at least a portion of the top surface of the linear extension 206 may be flat.

Borders between the linear extension 206 and the support rib body 204 may be rounded. This rounding may mitigate formation of stress concentrations near these borders.

In various embodiments, each of the linear extensions 206 has a length (e.g., in a vertical direction, etc.) that is approximately equal to between 2 in and 8 in, inclusive (e.g., 1.9 in, 2 in, 3 in, 5 in, 6 in, 8 in, 8.4 in, etc.).

In various embodiments, each of the linear extensions 206 has a width (e.g., in a horizontal direction, etc.) that is approximately equal to between 0.25 in and 1 in, inclusive (e.g., 0.2375 in, 0.25 in, 0.5 in, 0.75 in, 1 in, 1.05 in, etc.).

The cylinder block 108 also includes a fluid jacket (e.g., coolant jacket, water jacket, etc.). The fluid jacket circulates a fluid (e.g., coolant, water, etc.) through jacket channels 408 (e.g., runners, etc.) formed in the cylinder block 108. The jacket channels 408 extend within the cylinder block 108 and around the cylinder block cylinder portions 127. The jacket channels 408 facilitate routing of the fluid through the cylinder block 108 and around the cylinder block cylinder portions 127. As a result, the jacket channels 408 enable the fluid to provide cooling to the cylinder block cylinder portions 127. As shown in FIG. 4, the support ribs 202 are configured such that the jacket channels 408 extend between the cylinder block upper bores 124 and the cylinder block cylinder portions 127.

Figure 5:
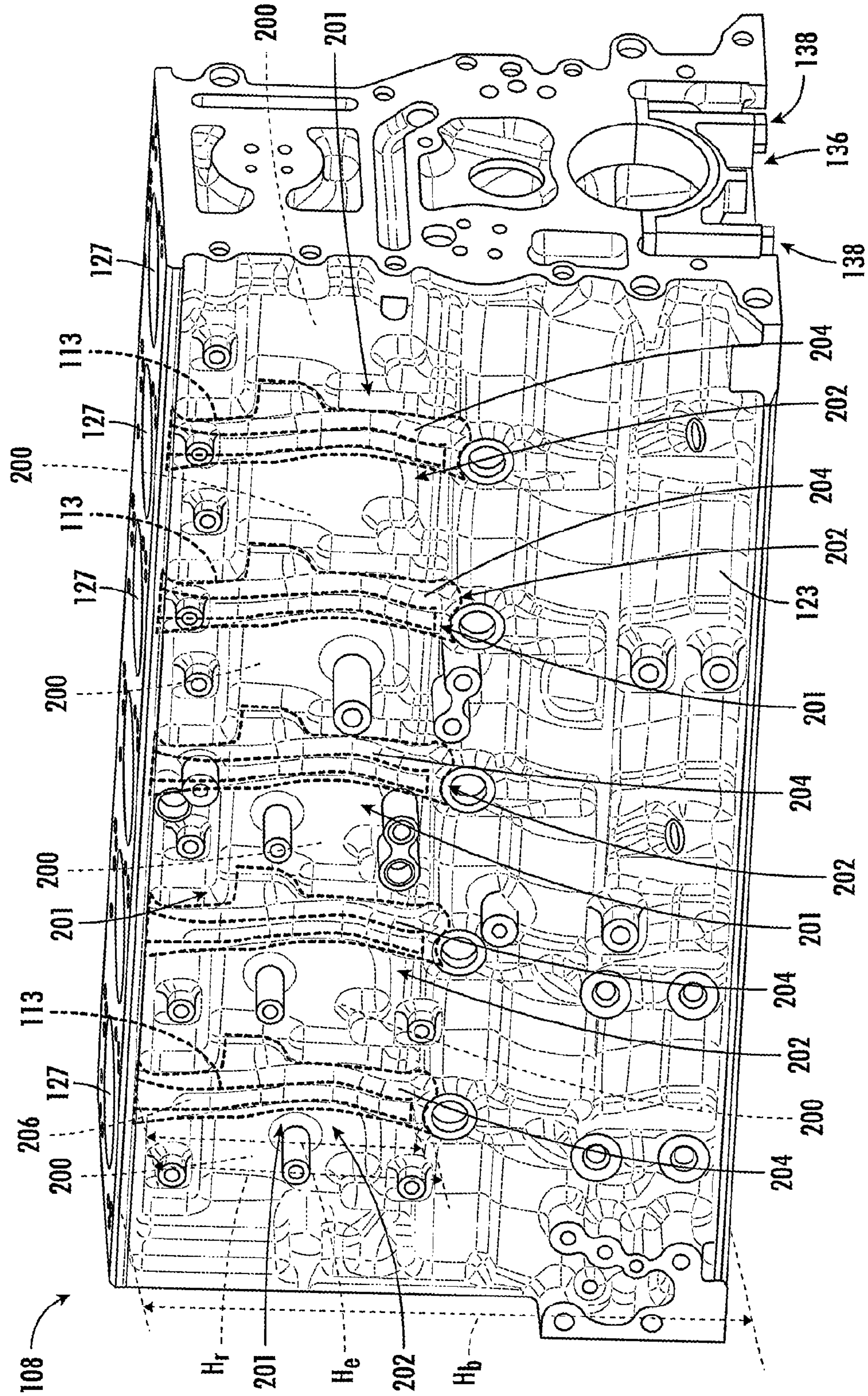
FIG. 5 is a perspective view of another example cylinder block.

FIG. 5 illustrates the cylinder block 108 according to various embodiments. In these embodiments, the linear extensions 206 are less pronounced than in the embodiment of FIGS. 2-4. Specifically, as shown in FIG. 5, each of the linear extensions 206 extends along an entire length of one of the support ribs 202. In the embodiment of FIGS. 2-4, each of the linear extensions 206 extends along only a portion of an entire length of one of the support ribs 202.

Figure 6:
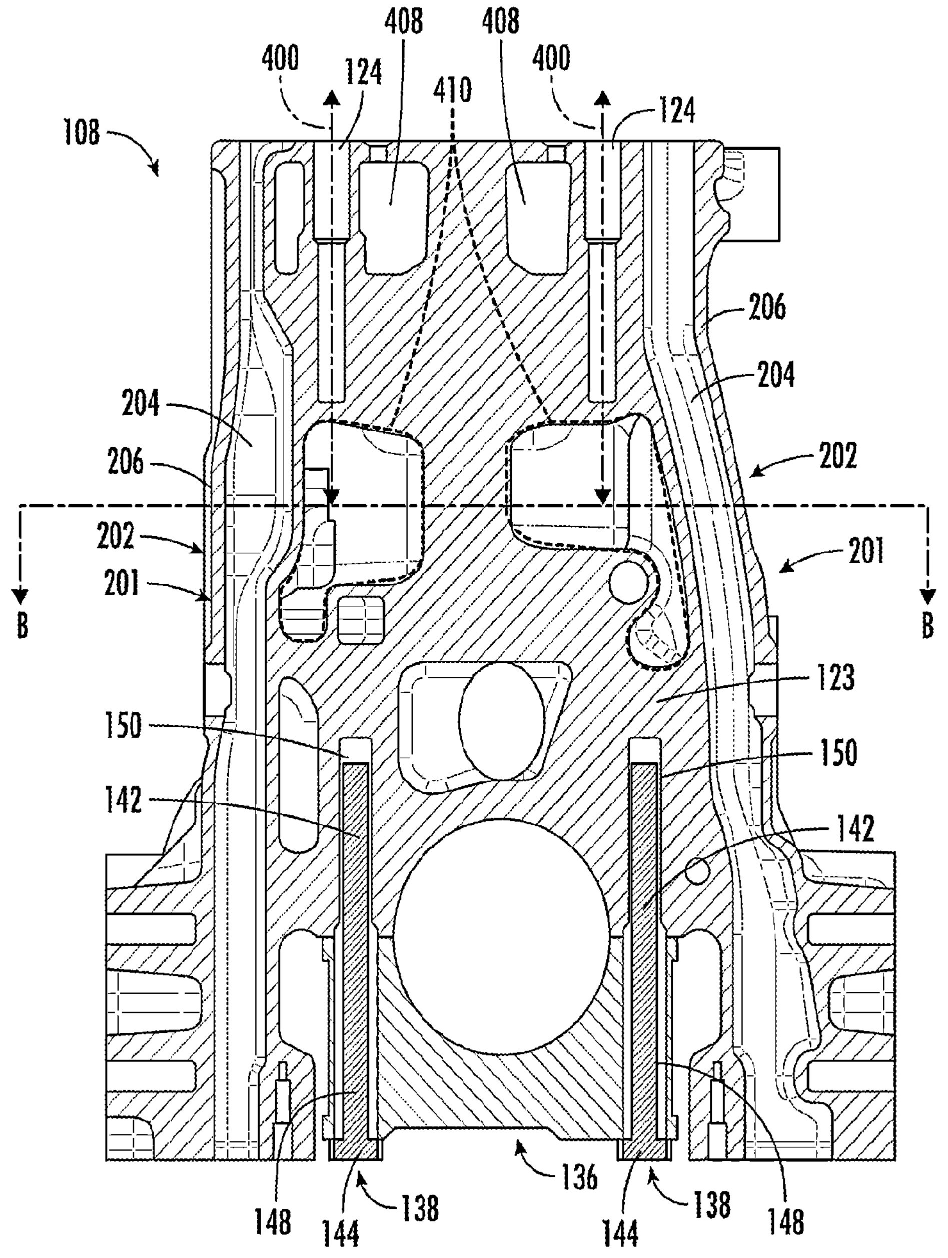
FIG. 6 is a cross-sectional view of another example cylinder block.
Figure 7:
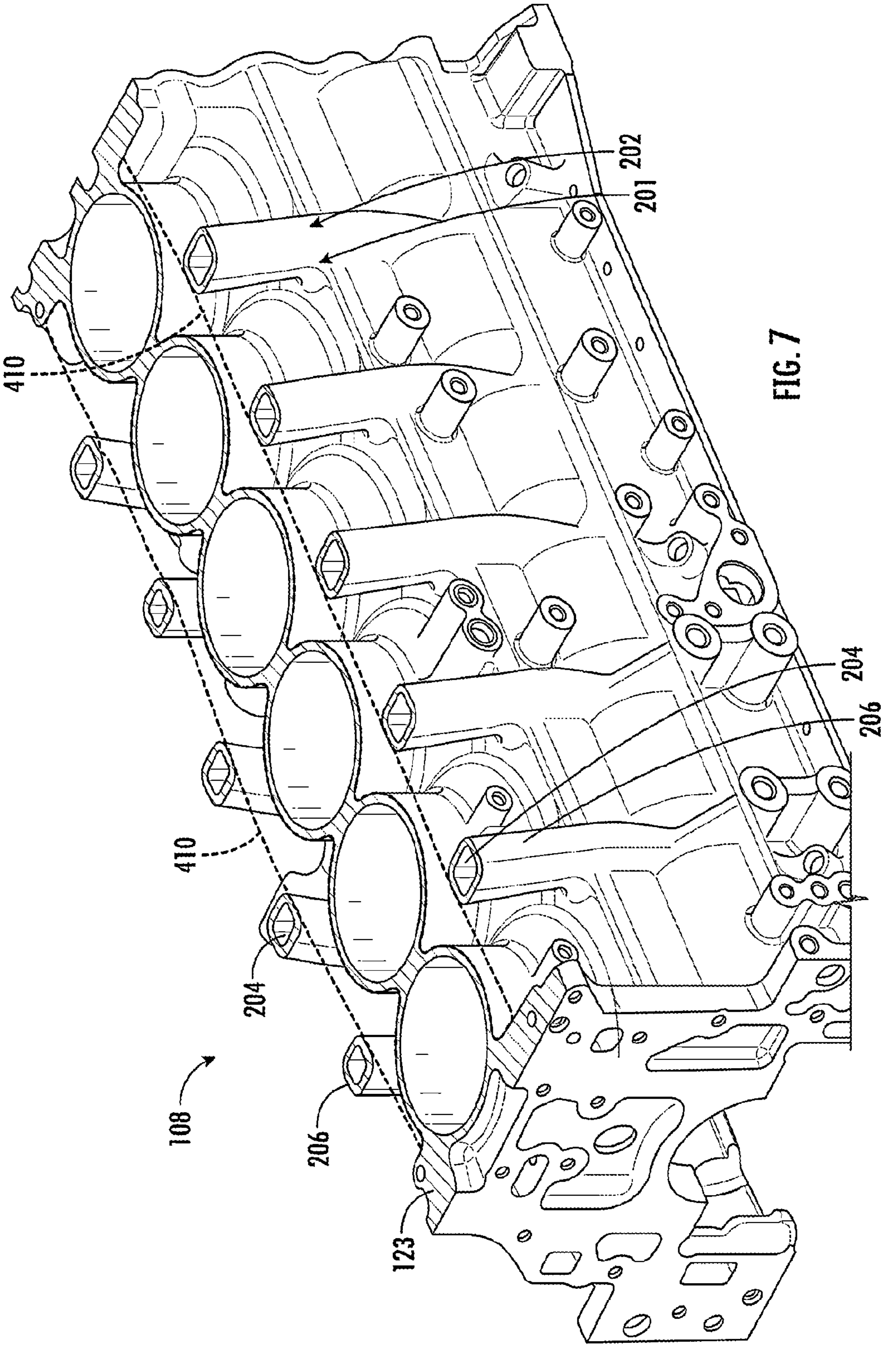
FIG. 7 is a cross-sectional view of the cylinder block shown in FIG. 6 taken along plane B-B.
Figure 8:
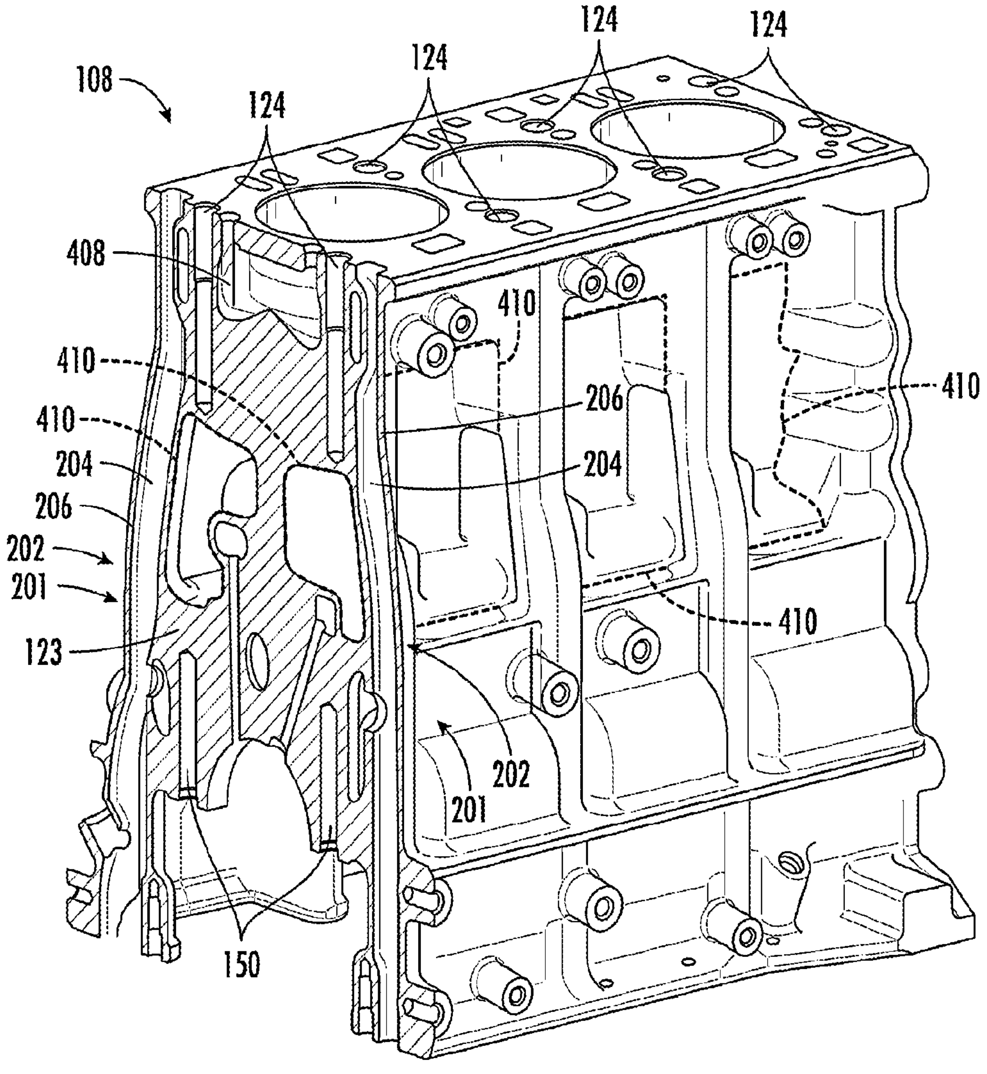
FIG. 8 is a perspective cross-sectional view of the cylinder block shown in FIG. 6.

FIGS. 6-8 illustrate the cylinder block 108 according to various embodiments. As shown in FIGS. 6-8, the cylinder block 108 also includes cylinder block recesses 410 (e.g., cavities, etc.) formed in the cylinder block 108. The cylinder block recesses 410 extend within the cylinder block 108 and around at least one of the cylinder block cylinder portions 127. Additionally, each of the cylinder block recesses 410 extends between at least one of the support rib bodies 204 and at least one of the cylinder block cylinder portions 127. The cylinder block recesses 410 facilitate a reduction of weight of the cylinder block 108. The cylinder bore upper axes 400 and/or the cylinder bore lower axes 402 may extend through one of the cylinder block recesses 410.

As shown in FIGS. 7 and 8, the support ribs 202 are configured such that the cylinder block recesses 410 extend between the cylinder block cylinder portions 127 and the support rib bodies 204. The cylinder block 108 is also configured such that the cylinder block recess 410 extend between the cylinder block upper bores 124 and the cylinder block lower bores 150. As a result, the cylinder block upper bores 124 are positioned above the cylinder block recess 410 and the cylinder block lower bores 150 are positioned below the cylinder block recesses 410. As a result, the linear extensions 206 carry the force from the upper fasteners 112 over the cylinder block recesses 410 outward and towards a side of the cylinder block 108 and also carry the force from the lower fasteners 138 over the cylinder block recesses 410 outward and towards the side of the cylinder block 108. Forces are transferred along the linear extensions 206, thus enabling the weight of the cylinder block 108 to be decreased by the use of the cylinder block recesses 410.

As shown in FIGS. 6-8, the support ribs 202 may be configured such that the support rib bodies 204 are hollow. An open interior of each of the support ribs 202 is separated from the jacket channels 408 and the cylinder block recesses 410. The open interiors of the support ribs 202 provide significant mass savings to the cylinder block 108, and the linear extensions 206 provide strength sufficient to enable use of these support ribs 202.

Figure 9:
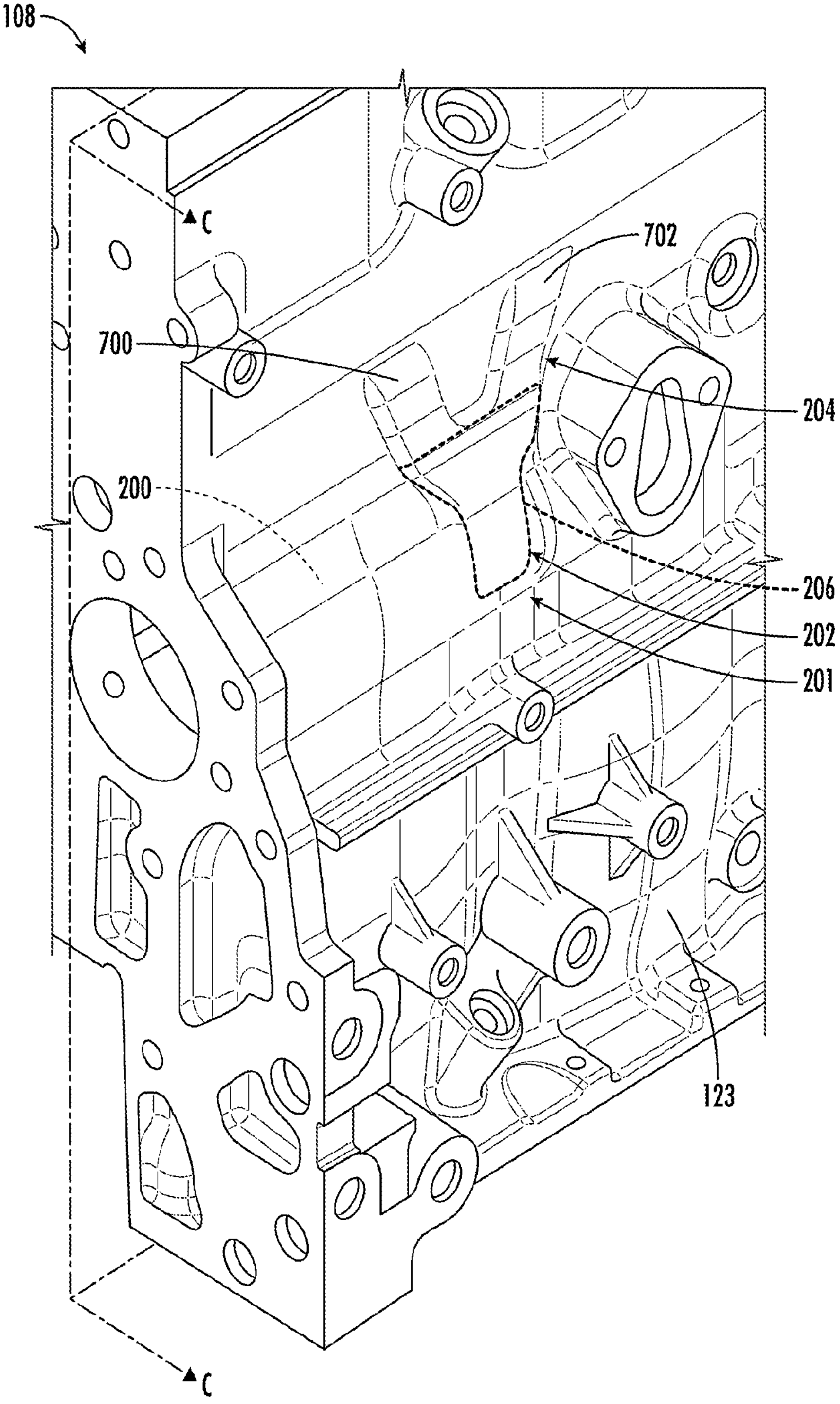
FIG. 9 is a perspective view of another example cylinder block.
Figure 10:
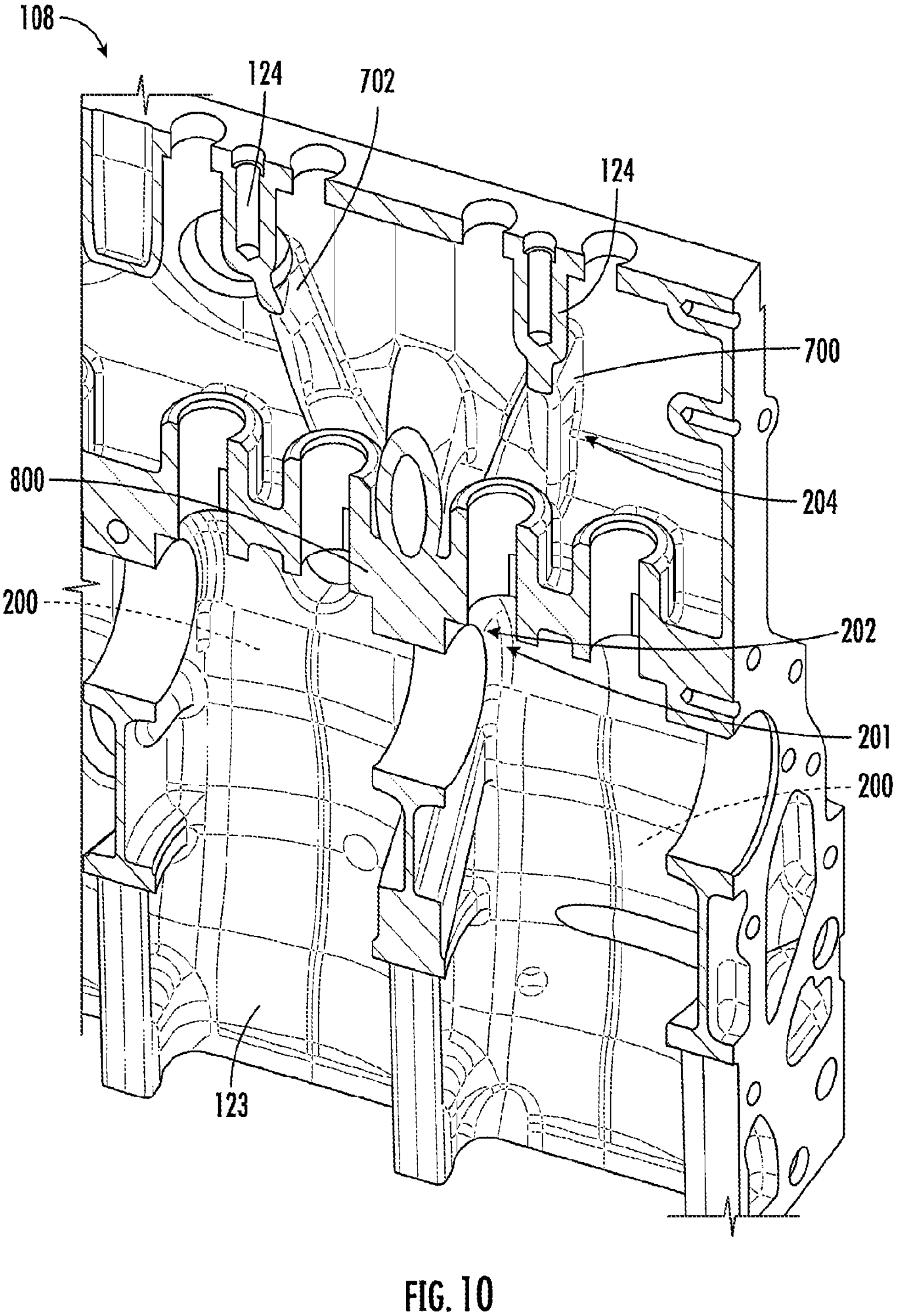
FIG. 10 is a cross-sectional view of the cylinder block shown in FIG. 9 taken along plane C-C.
Figure 11:
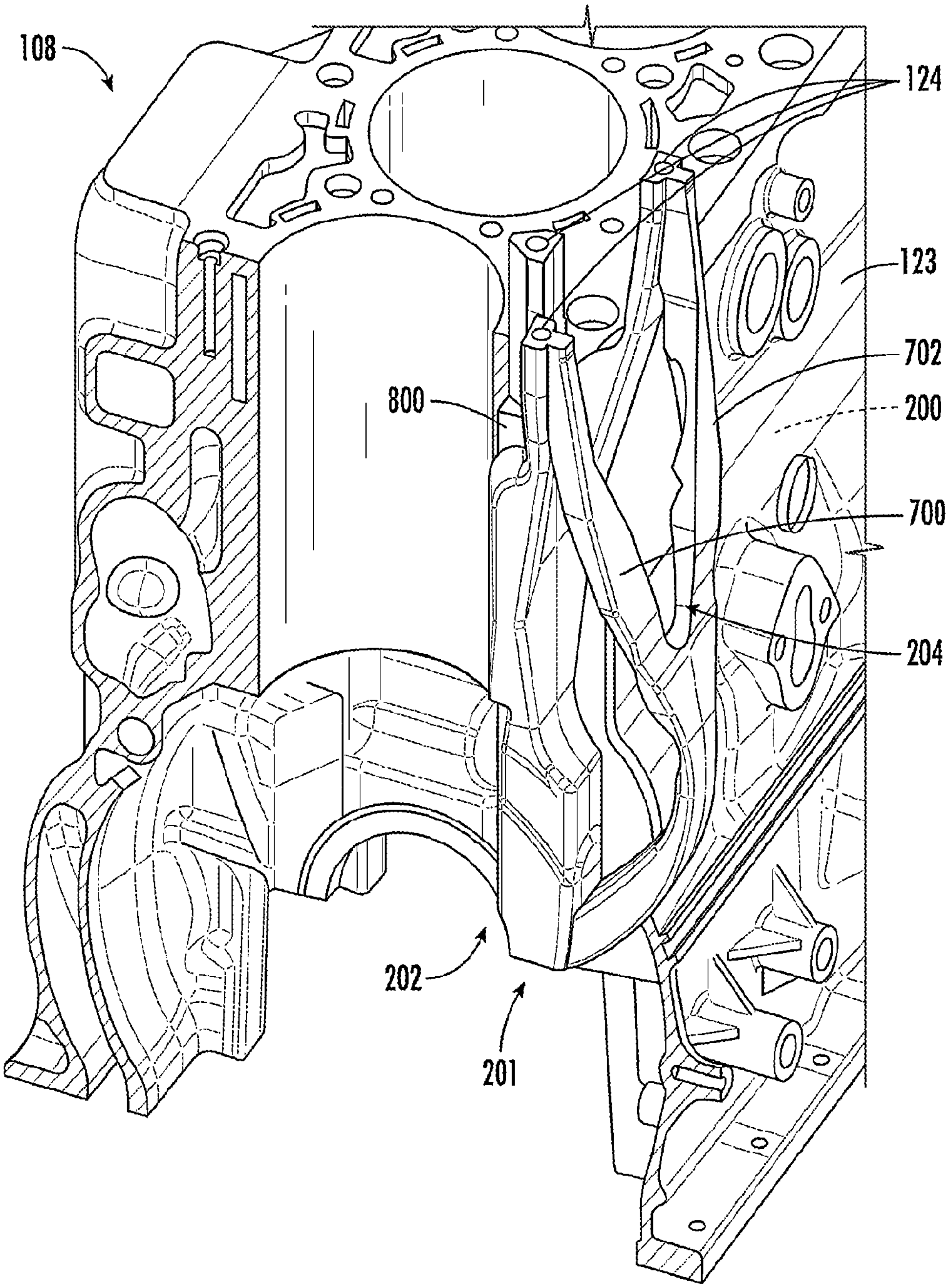
FIG. 11 is a perspective view of another example cylinder block.

FIGS. 9-11 illustrate the cylinder block 108 according to various embodiments. In these embodiments, a significant portion of the support rib bodies 204 extends within the cylinder block 108.

Specifically, each of the support rib bodies 204 includes a first support rib arm 700 (e.g., extension, etc.). The first support rib arm 700 is contiguous with one of the cylinder block upper bores 124 and the linear extension 206 of the support rib 202. Additionally, the first support rib arm 700 extends away from the cylinder block upper bore 124 (with which the first support rib arm 700 is contiguous) and the cylinder block cylinder portion 127 and towards a side surface of the cylinder block 108. The first support rib arm 700 transfers the force from the cylinder block upper bore 124 (with which the first support rib arm 700 is contiguous) towards the side surface of the cylinder block 108.

Each of the support rib bodies 204 also includes a second support rib arm 702 (e.g., extension, etc.). The second support rib arm 702 is contiguous with another of the cylinder block upper bores 124 and the linear extension 206 of the support rib 202. Additionally, the second support rib arm 702 extends away from the cylinder block upper bore 124 (with which the second support rib arm 702 is contiguous) and the cylinder block cylinder portion 127 and towards a side surface of the cylinder block 108. The second support rib arm 702 transfers the force from the cylinder block upper bore 124 (with which the second support rib arm 702 is contiguous) towards the side surface of the cylinder block 108.

FIG. 10 illustrates an internal view of the cylinder block 108 shown in FIG. 9 such that internal details of the support rib 202 are shown in greater detail. As shown in FIG. 10, each of the support rib bodies 204 also includes a support rib brace 800 (e.g., extension, etc.). The support rib brace 800 is contiguous with another of the cylinder block upper bores 124 and the linear extension 206 of the support rib 202. Additionally, the support rib brace 800 extends away from the cylinder block upper bore 124 (with which the support rib brace 800 is contiguous) and the cylinder block cylinder portion 127 and towards a side surface of the cylinder block 108. The support rib brace 800 transfers the force from the cylinder block upper bore 124 (with which the support rib brace 800 is contiguous) towards the side surface of the cylinder block 108.

The support rib brace 800 is disposed between the first support rib arm 700 and the second support rib arm 702. A portion of the support rib brace 800 is positioned inward of the first support rib arm 700, the second support rib arm 702, and the linear extension 206, as shown in FIG. 11. The support rib 202 is configured such that the camshaft 134 (not shown in FIG. 11) is received between the support rib brace 800, the first support rib arm 700, the second support rib arm 702, and the linear extension 206.

In some embodiments, the support rib 202 is symmetrical about a plane bisecting the support rib brace 800 and extending between the first support rib arm 700 and the second support rib arm 702.

Figure 12:
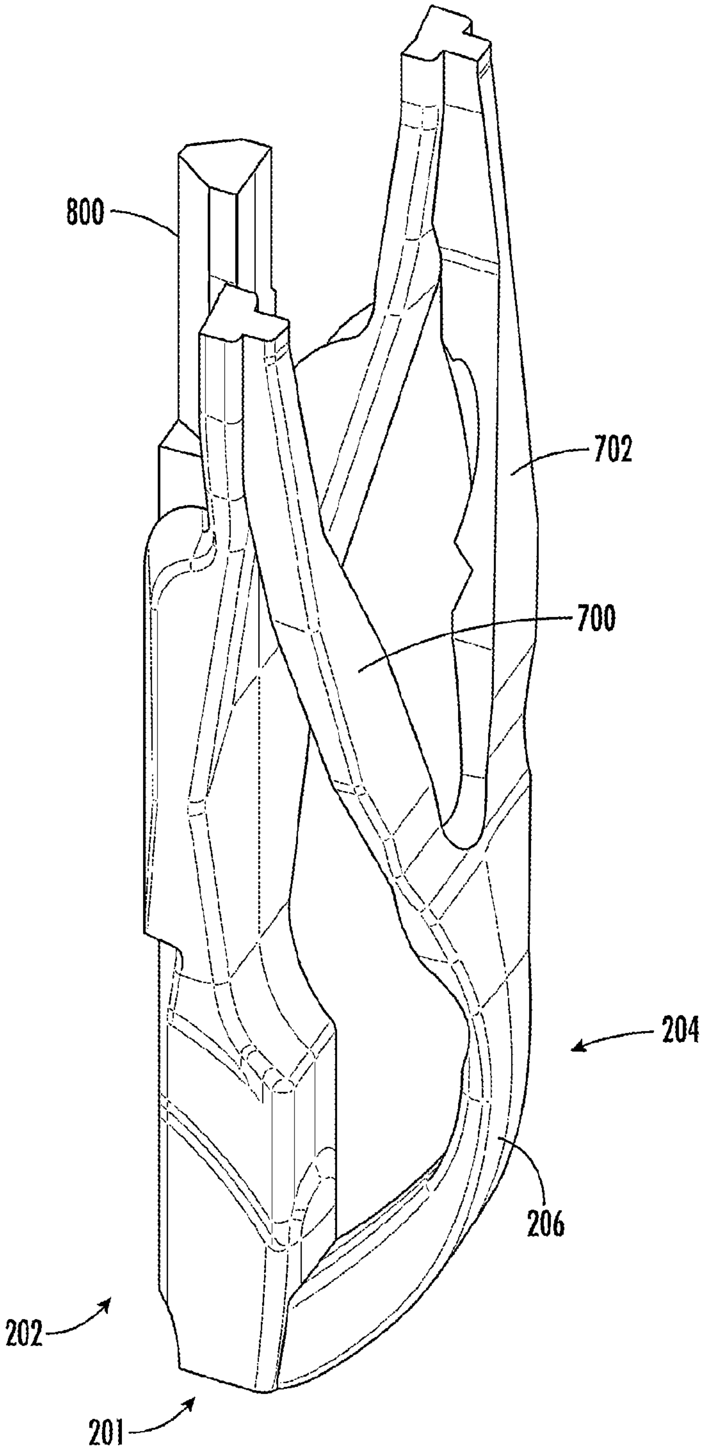
FIG. 12 is a perspective view of a support rib.

FIG. 12 illustrates the support rib 202 in isolation. As shown in FIG. 12, the linear extension 206 is configured such that a portion of the linear extension 206 that is contiguous with the first support rib arm 700 and the second support rib arm 702 extends away from the support rib brace 800, and such that another portion of the linear extension 206 that is contiguous with the support rib brace 800 extends towards the support rib brace 800.

In various embodiments, the cylinder block 108 is formed by casting. In other words, the cylinder block 108 is formed by a casting process where one or more cores is placed in a mold and molten material (e.g., metal, etc.) is poured into the mold around the cores. The mold and/or the cores may be used to incorporate features into the cylinder block 108. For example, extension can be provided in a core (e.g., jacket core, etc.) to form the support rib 202 or a hole can be provided in a core (e.g., oil drain core, etc.) to form the support rib 202.

In some embodiments, the cylinder block 108 is integrally formed via additive manufacturing (e.g., the various components of the cylinder block 108 are integrally formed with one another). For example, the cylinder block 108 may be integrally formed using 3D printing, selective laser sintering, selective laser melting (SLM), direct metal laser sintering (DMLS), electron beam melting (EBM), ultrasonic additive manufacturing (UAM), fused deposition modeling (FDM), fused filament fabrication (FFF), stereolithography (SLA), material jetting, binder jetting or other similar processes.

As explained above, the support ribs 202 and the cylinder skirt portions 200 are formed and joined together as part of a single manufacturing step (e.g., 3D printing, selective laser sintering, SLM, DMLS, EBM, UAM, FDM, FFF, SLA, material jetting, binder jetting, etc.) to a create a single-piece or unitary construction, the support ribs 202 and the cylinder skirt portions 200, that cannot be disassembled without an at least partial destruction of the support ribs 202 and the cylinder skirt portions 200. For example, the portions of the support ribs 202 and the cylinder skirt portions 200 are: (i) not separable from each other (e.g., one portion of the support rib 202 cannot be separated from the cylinder skirt portion 200 without destroying the support ribs 202 and the cylinder skirt portions 200, etc.); (ii) not formed separately from each other; and (iii) there are no gaps or joints along borders between contiguous portions of the support ribs 202 and the cylinder skirt portions 200 (e.g., portions that share a border, etc.).

In some embodiments, portions (e.g., the support rib body 204, the linear extension 206, etc.) of one or more of the support ribs 202 are not identical to corresponding portions (e.g., the support rib body 204, the linear extension 206, etc.)) of others of the support ribs 202. For example, the support rib body 204 of one of the support ribs 202 may not be identical to the support rib body 204 of another of the support ribs 202. In another example, the linear extension 206 of one of the support ribs 202 may not be identical to the linear extension 206 of another of the support ribs 202. In yet another example, the support rib body 204 and the linear extension 206 of one of the support ribs 202 are not identical to the support rib body 204 and the linear extension 206 of another of the support ribs 202.

In some embodiments, the support ribs 202 do not include all of the features of the support ribs 202 described herein. For example, one of the support ribs 202 may be configured such that one of the support rib bodies 204 is angled towards another of the support rib bodies 204. In another example, one or more of the support ribs 202 does not include the linear extension 206.

The present disclosure also comprises embodiments as defined in the following numbered sections. These embodiments are not intended in any way to be limiting.

1. A cylinder block comprising:
 a cylinder block body defining a first cylinder block upper bore; and
 a load path structure comprising a first support rib having a first support rib body interfacing with the first cylinder block upper bore, the load path structure being configured to transfer a load from the first cylinder block upper bore along a non-linear path within the cylinder block body away from the first cylinder block upper bore.

2. The cylinder block of claim 1, further comprising a first cylinder skirt portion contiguous with the first support rib;
 wherein the cylinder block body defines a second cylinder block upper bore;
 wherein the load path structure further comprises a second support rib contiguous with the first cylinder skirt portion and separated from the first support rib by the first cylinder skirt portion, the second support rib comprising a second support rib body; and
 wherein the first support rib, the first cylinder skirt portion, and the second support rib cooperate to define a cylinder wall cavity.

3. The cylinder block of claim 2, further comprising a first cylinder block cylinder portion;
 wherein the first cylinder block upper bore is disposed adjacent the first cylinder block cylinder portion; and
 wherein the second cylinder block upper bore is disposed adjacent the first cylinder block cylinder portion.

4. The cylinder block of claim 3, further comprising a second cylinder block cylinder portion;
 wherein the second cylinder block upper bore is disposed between the first cylinder block cylinder portion and the second cylinder block cylinder portion.

5. The cylinder block of claim 1, wherein:
 the load path structure further comprises a second support rib having a second support rib body;
 the cylinder block body defines a second cylinder block upper bore;
 the second support rib body interfaces with the second cylinder block upper bore; and
 the load path structure is configured to transfer a second load from the second cylinder block upper bore along a second non-linear path within the cylinder block body away from the second cylinder block upper bore.

6. The cylinder block of claim 5, wherein the first support rib and the second support rib are disposed along the same side of the cylinder block.

7. The cylinder block of claim 5, further comprising a cylinder skirt portion extending between the first support rib body and the second support rib body, the cylinder skirt portion being recessed relative to the first support rib body and the second support rib body.

8. The cylinder block of claim 5, wherein the first support rib and the second support rib are disposed along opposite sides of the cylinder block.

9. The cylinder block of claim 8, further comprising:
 a first cylinder block cylinder portion; and
 a second cylinder block cylinder portion;
 wherein the first support rib and the second support rib are aligned along an axis that extends between the first cylinder block cylinder portion and the second cylinder block cylinder portion.

10. The cylinder block of claim 9, further comprising a cylinder block recess extending around the first cylinder block cylinder portion, between the first support rib and the first cylinder block cylinder portion, between the second support rib and the first cylinder block cylinder portion, between the first cylinder block cylinder portion and the second cylinder block cylinder portion, and between the first support rib and the second support rib.

11. The cylinder block of claim 9 or 10, further comprising a jacket channel extending between the first cylinder block cylinder portion and the second cylinder block cylinder portion.

12. The cylinder block of any one of claims 2-5, wherein the first support rib and the second support rib are aligned across the cylinder block.

13. The cylinder block of any one of claims 2-5 and 7-10, wherein the first support rib is angled towards the second support rib.

14. An internal combustion engine system comprising:

the cylinder block of any one of claims 1-10;

a cylinder head; and an upper fastener coupling the cylinder head to the cylinder block, the upper fastener threadably engaged with the first cylinder block upper bore;

wherein the first support rib transfers forces from the upper fastener away from the cylinder head.

15. A cylinder block comprising:

a cylinder block body defining a first cylinder block upper bore and a second cylinder block upper bore;

a load path structure comprising:

a first support rib having a first support rib body interfacing with the first cylinder block upper bore, the first support rib extending away from the cylinder block body in a direction that is parallel to the first cylinder block upper bore, and a second support rib having a second support rib body interfacing with the second cylinder block upper bore, the second support rib extending away from the cylinder block body in a direction that is parallel to the second cylinder block upper bore; and a cylinder skirt portion extending between the first support rib body and the second support rib body, the cylinder skirt portion being recessed relative to the first support rib and the second support rib.

16. The cylinder block of claim 15, wherein the cylinder block body, the load path structure, and the cylinder skirt portion are integrally formed with one another.

17. The cylinder block of claim 15 or 16, wherein:

the cylinder block body further defines a first cylinder block lower bore and a second cylinder block lower bore;

the first cylinder block upper bore and the second cylinder block upper bore are aligned in a first direction; and the first cylinder block lower bore and the second cylinder block lower bore are aligned in a second direction that is parallel to the first direction.

18. An internal combustion engine system comprising:

the cylinder block of claim 17;

a cylinder head;

an upper fastener coupling the cylinder head to the cylinder block, the upper fastener threadably engaged with the first cylinder block upper bore;

a main cap; and a lower fastener coupling the main cap to the cylinder block, the lower fastener threadably engaged with the first cylinder block lower bore.

19. The internal combustion engine system of claim 18, wherein:

the first cylinder block upper bore is centered on a first axis; and the first cylinder block lower bore is centered on a second axis that is parallel to the first axis.

20. The internal combustion engine system of claim 19, wherein:

the cylinder block further comprises:

a first cylinder block cylinder portion, and a cylinder block recess extending around the first cylinder block cylinder portion;

the first axis extends through the cylinder block recess; and the second axis extends through the cylinder block recess.

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A cylinder block comprising:
a cylinder block body defining a first cylinder block upper bore;
a first lower portion of a first cylinder;
a second lower portion of a second cylinder; and
a load path structure comprising a first support rib having a first support rib body interfacing with the first cylinder block upper bore and a beam extending outward from the first support rib body and having a first end positioned adjacent an end surface of the cylinder block and a second end, opposite the first end, located away from the first end, the load path structure being configured to transfer a load from the first cylinder block upper bore along a non-linear path within the cylinder block body away from the first cylinder block upper bore, the first support rib aligned with a vertical axis that extends between the first lower portion of the first cylinder and the second lower portion of the second cylinder.

2. The cylinder block of claim 1, further comprising a first cylinder skirt portion contiguous with the first support rib;
wherein the cylinder block body defines a second cylinder block upper bore;
wherein the load path structure further comprises a second support rib contiguous with the first cylinder skirt portion and separated from the first support rib by the first cylinder skirt portion, the second support rib comprising a second support rib body; and
wherein the first support rib, the first cylinder skirt portion, and the second support rib cooperate to define a cylinder wall cavity.

3. The cylinder block of claim 2,
wherein the first cylinder block upper bore is disposed adjacent the first lower portion of the first cylinder; and
wherein the second cylinder block upper bore is disposed adjacent the first lower portion of the first cylinder.

4. The cylinder block of claim 3, wherein the second cylinder block upper bore is disposed between the first lower portion of the first cylinder and the second lower portion of the second cylinder.

5. The cylinder block of claim 1, wherein:
the load path structure further comprises a second support rib having a second support rib body;
the cylinder block body defines a second cylinder block upper bore;
the second support rib body interfaces with the second cylinder block upper bore; and
the load path structure is configured to transfer a second load from the second cylinder block upper bore along a second non-linear path within the cylinder block body away from the second cylinder block upper bore.

6. The cylinder block of claim 5, wherein the first support rib and the second support rib are disposed along the same side of the cylinder block.

7. The cylinder block of claim 5, further comprising a cylinder skirt portion extending between the first support rib body and the second support rib body, the cylinder skirt portion being recessed relative to the first support rib body and the second support rib body.

8. The cylinder block of claim 5, wherein the first support rib and the second support rib are disposed along opposite sides of the cylinder block.

9. The cylinder block of claim 8, wherein the first support rib and the second support rib are aligned along the axis that extends between the first lower portion of the first cylinder and the second lower portion of the second cylinder.

10. The cylinder block of claim 9, further comprising a cylinder block recess extending around the first lower portion of the first cylinder, between the first support rib and the first lower portion of the first cylinder, between the second support rib and the first lower portion of the first cylinder, between the first lower portion of the first cylinder and the second lower portion of the second cylinder, and between the first support rib and the second support rib.

11. The cylinder block of claim 9, further comprising a jacket channel extending between the first lower portion of the first cylinder and the second lower portion of the second cylinder.

12. The cylinder block of claim 2, wherein the first support rib and the second support rib are aligned across the cylinder block.

13. The cylinder block of claim 2, wherein the first support rib is angled towards the second support rib.

14. An internal combustion engine system comprising:
the cylinder block of claim 1;
a cylinder head; and
an upper fastener coupling the cylinder head to the cylinder block, the upper fastener threadably engaged with the first cylinder block upper bore;
wherein the first support rib transfers forces from the upper fastener away from the cylinder head.

15. A cylinder block comprising:
a cylinder block body defining a first cylinder block upper bore and a second cylinder block upper bore;
a first lower portion of a first cylinder;
a second lower portion of a second cylinder;
a load path structure comprising:
a first support rib having a first support rib body interfacing with the first cylinder block upper bore and a first beam extending outward from the first support rib body and having a first beam first end positioned adjacent an end surface of the cylinder block body and a first beam second end, opposite the first end, located away from the first end, the first support rib extending away from the cylinder block body in a direction that is parallel to the first cylinder block upper bore, the first support rib aligned with a vertical axis that extends between the first lower portion of the first cylinder and the second lower portion of the second cylinder, and
a second support rib having a second support rib body interfacing with the second cylinder block upper bore and a second beam extending outward from the second support rib body and having a second beam first end positioned adjacent the end surface of the cylinder block body and a second beam second end, opposite the first end, located away from the first end, the second support rib extending away from the cylinder block body in a direction that is parallel to the second cylinder block upper bore; and a cylinder skirt portion extending between the first support rib body and the second support rib body, the cylinder skirt portion being recessed relative to the first support rib and the second support rib.

16. The cylinder block of claim 15, wherein the cylinder block body, the load path structure, and the cylinder skirt portion are integrally formed with one another.

17. The cylinder block of claim 15, wherein:

the cylinder block body further defines a first cylinder block lower bore and a second cylinder block lower bore;

the first cylinder block upper bore and the second cylinder block upper bore are aligned in a first direction; and the first cylinder block lower bore and the second cylinder block lower bore are aligned in a second direction that is parallel to the first direction.

18. An internal combustion engine system comprising:

the cylinder block of claim 17;

a cylinder head;

an upper fastener coupling the cylinder head to the cylinder block, the upper fastener threadably engaged with the first cylinder block upper bore;

a main cap; and a lower fastener coupling the main cap to the cylinder block, the lower fastener threadably engaged with the first cylinder block lower bore.

19. The internal combustion engine system of claim 18, wherein:

the first cylinder block upper bore is centered on a first axis; and the first cylinder block lower bore is centered on a second axis that is parallel to the first axis.

20. The internal combustion engine system of claim 19, wherein:

the cylinder block further comprises:

a cylinder block recess extending around the first lower portion of the first cylinder;

the first axis extends through the cylinder block recess; and the second axis extends through the cylinder block recess.

* * * * *